US011405801B1

(12) United States Patent
Qureshi et al.

(10) Patent No.: US 11,405,801 B1
(45) Date of Patent: Aug. 2, 2022

(54) MANAGING RADIO-BASED NETWORK INFRASTRUCTURE USING UNMANNED VEHICLES

(71) Applicant: Amazon Technologies, Inc., Seattle, WA (US)

(72) Inventors: Tipu Saleem Qureshi, Seattle, WA (US); Diwakar Gupta, Seattle, WA (US); Upendra Bhalchandra Shevade, Washington, DC (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/206,025

(22) Filed: Mar. 18, 2021

(51) Int. Cl.
*H04W 64/00* (2009.01)
*H04B 7/185* (2006.01)
*H04W 16/26* (2009.01)
*H04W 28/16* (2009.01)

(52) U.S. Cl.
CPC ........ *H04W 16/26* (2013.01); *H04B 7/18506* (2013.01); *H04W 28/16* (2013.01); *H04W 64/003* (2013.01)

(58) Field of Classification Search
CPC ... H04W 16/26; H04W 28/16; H04W 64/003; H04B 7/18506
See application file for complete search history.

(56) References Cited

U.S. PATENT DOCUMENTS

| | | | |
|---|---|---|---|
| 2016/0028471 A1* | 1/2016 | Boss | H04W 28/0289 455/406 |
| 2017/0013476 A1* | 1/2017 | Suthar | H04W 24/08 |
| 2019/0268781 A1* | 8/2019 | Nilssson | G05D 1/0022 |
| 2019/0289613 A1* | 9/2019 | Fanelli | H04W 4/029 |

* cited by examiner

*Primary Examiner* — Ashley Shivers
(74) *Attorney, Agent, or Firm* — Thomas Horstemeyer, LLP

(57) ABSTRACT

Disclosed are various embodiments for using unmanned vehicles to manage radio-based network infrastructure. In one embodiment, a determination is made to add coverage to a radio-based network via a radio unit. An unmanned vehicle carrying the radio unit as a payload is instructed to travel to a particular location. The unmanned vehicle is instructed to deliver the radio unit to the particular location. The radio unit is activated to add the coverage to the radio-based network.

20 Claims, 13 Drawing Sheets

MANAGING RADIO-BASED NETWORK INFRASTRUCTURE USING UNMANNED VEHICLES

BACKGROUND 5G is the fifth-generation technology standard for broadband cellular networks, which is planned eventually to take the place of the fourth-generation (4G) standard of Long-Term Evolution (LTE). 5G technology will offer greatly increased bandwidth, thereby broadening the cellular market beyond smartphones to provide last-mile connectivity to desktops, set-top boxes, laptops, Internet of Things (IoT) devices, and so on. Some 5G cells may employ frequency spectrum similar to that of 4G, while other 5G cells may employ frequency spectrum in the millimeter wave band. Cells in the millimeter wave band will have a relatively small coverage area but will offer much higher throughput than 4G.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
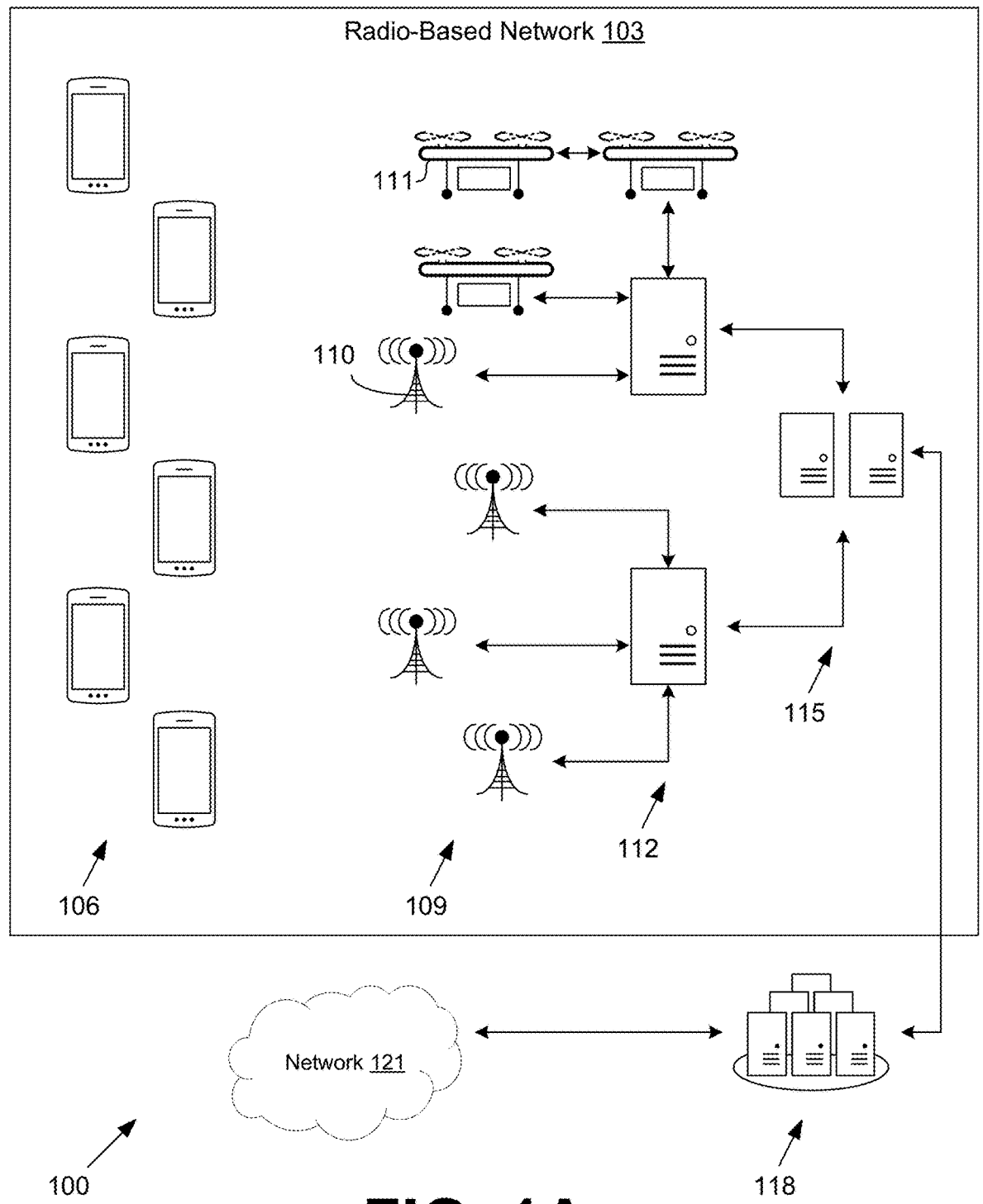
FIG. 1A is a drawing of an example of a communication network that is deployed and managed according to various embodiments of the present disclosure.

The present disclosure relates generally to the use of unmanned vehicles (UVs), such as unmanned aerial vehicles (e.g., a drone) and unmanned terrestrial vehicles (e.g., a driverless car), in order to provide network connectivity and computing capacity. There are many geographic areas that do not have sufficient network connectivity. For example, it may be too costly to deploy fiber-based network access to rural areas, and coverage from existing radio-based networks (such as 4G and/or 5G radio access networks) may be spotty or non-existent. Satellite-delivered connectivity may be unreliable, too costly, or have unacceptable latency. In various scenarios, existing network infrastructure may be present but may be at capacity or otherwise incapable of meeting quality-of-service requirements for a customer. In some of these cases, the demand conditions affecting the existing network infrastructure may be temporary in nature. Additionally, some customers may require edge computing capacity to execute a computing workload, but the customers may be too far from a data center or lack a sufficient network connection to meet quality-of-service requirements such as latency.

Various embodiments of the present disclosure deploy UVs to address these problems. In a first set of embodiments, UVs may be equipped to deliver and maintain portable radio units for use by a radio-based network to fill coverage gaps. These radio units may act as base stations or repeaters for the radio-based network. The radio units may be ruggedized devices for deployment in exterior conditions, such as on rooftops or other designated areas. In some cases, the radio units may be battery powered, and UVs can be sent to replace or charge depleted batteries. In other cases, the UV can deliver the radio unit to a docking station that incorporates a power transfer port and/or a network port. In some scenarios, a radio unit may include edge computing capacity that can be used to execute network function workloads of the radio-based network and/or other customer workloads. In some scenarios, the radio unit may include significant data storage capacity, such that high bitrate data transfer may be achieved by having the UV physically transport the stored data to a recipient.

In a second set of embodiments, UVs themselves may incorporate or carry resources that can provide edge computing capacity and/or network connectivity to geographies that need such resources. Essentially, the UV becomes a portable edge data center that can execute computing workloads to meet customer requirements that otherwise could not be served, including quality-of-service requirements and data sovereignty or localization requirements. In various situations, the UVs may provide edge computing capacity and/or network connectivity while flying or while stationary. UVs may land at or travel to docking stations at remote locations to attach to power transfer ports and/or network ports. Travel paths for the UV may be optimized to serve multiple customers, and optimal landing locations may be determined based on multiple factors, such as remaining fuel. The UVs can also service or interact with existing computing infrastructure at a location, including downloading or uploading data or exchanging hardware components.

In a third set of embodiments, ephemeral radio-based network resources served by UVs can be allocated to customers based on demand. As used herein, the resources provided by the UVs are "ephemeral" in that they may be available only for a period of time when the UVs are within sufficient proximity to an end user device or other customer device to establish wireless communications with the end user device or customer device (e.g., to act as a base station or to provide backhaul or other forwarding) and/or provide resources (e.g., compute, storage, networking) to the end user device or customer device within the parameters of any service guarantees (e.g., latency guarantees). It will be appreciated that as the UVs travel, the UVs may pass into and out of geographic areas that enable the UVs to provide resources to customers, thus making their availability ephemeral. As an example, ephemeral network connectivity may be sufficient for Internet of Things (IoT) devices to upload telemetry data. As another example, a satellite network service using low Earth orbit (LEO) satellites may have a temporary coverage gap that could be filled by a UV. As yet another example, a radio-based network covering a fairground or another event center may temporarily need additional capacity based upon demand or congestion from an increase in visitors to be seen at a defined time period. As still another example, a radio-based network may have damaged infrastructure due to a severe weather event or another disaster, and the disclosed UVs can be positioned to fill the coverage gap created by the damaged infrastructure. It will be appreciated that other radio-based network use cases can benefit from the disclosed UVs.

Customers may bid for edge computing capacity and/or network connectivity to be provided at a location by a UV, and the cost may depend on available resources. If a UV is already on a travel path to a destination, unallocated computing capacity may be offered to customers along the travel path who can use the unallocated computing capacity for a time period as the UV passes by. Such customers may enter bids, and the travel path may be altered and/or the travel time can be lengthened based on the demand as evidenced by the bids.

Incorporating UVs as described offers a number of enhancements for deploying or augmenting radio-based networks. Previous deployments of radio-based networks have relied upon manual deployment and configuration at each step of the process. This proved to be extremely time consuming and expensive. Further, in previous generations, software was inherently tied to vendor-specific hardware, thereby preventing customers from deploying alternative software. By contrast, with 5G, hardware is decoupled from the software stack, which allows more flexibility, and allows components of the radio-based network to be executed on cloud provider infrastructure. Using a cloud delivery model for a radio-based network, such as a 5G network, can facilitate handling network traffic from hundreds up to billions of connected devices and compute-intensive applications, while delivering faster speeds, lower latency, and more capacity than other types of networks.

Historically, enterprises have had to choose between performance and price when evaluating their enterprise connectivity solutions. Cellular networks may offer high performance, great indoor and outdoor coverage, and advanced Quality of Service (QoS) connectivity features, but private cellular networks can be expensive and complex to manage. While Ethernet and Wi-Fi require less upfront investment and are easier to manage, enterprises often find that they can be less reliable, require a lot of work to get the best coverage, and do not offer QoS features such as guaranteed bit rate, latency, and reliability.

Enterprises can freely deploy various 5G devices and sensors across the enterprise—factory floors, warehouses, lobbies, and communications centers—and manage these devices, enroll users, and assign QoS from a management console. With the disclosed technology, customers can assign constant bit rate throughput to all their devices (such as cameras, sensors, or IoT devices), reliable low latency connection to devices running on factory floors, and broadband connectivity to all handheld devices. The disclosed service can manage all of the software needed to deliver connectivity that meets the specified constraints and requirements. This enables an entirely new set of applications that have strict QoS or high IoT device density requirements that traditionally have not been able to run on Wi-Fi networks. Further, the disclosed service can provide application development application programming interfaces (APIs) that expose and manage 5G capabilities like QoS, enabling customers to build applications that can fully utilize the latency and bandwidth capabilities of their network without having to understand the details of the network.

Additionally, the disclosed service can provide a private zone to run local applications within a cloud provider network. This private zone can be connected to and effectively part of a broader regional zone, and allows the customer to manage the private zone using the same APIs and tools as used in the cloud provider network. Like an availability zone, the private zone can be assigned a virtual private network subnet. An API can be used to create and assign subnets to all zones that the customer wishes to use, including the private zone and other existing zones. A management console may offer a simplified process for creating a private zone. Virtual machine instances and containers can be launched in the private zone just as in regional zones. Customers can configure a network gateway to define routes, assign IP addresses, set up network address translation (NAT), and so forth. Automatic scaling can be used to scale the capacity of virtual machine instances or containers as needed in the private zone. The same management and authentication APIs of the cloud provider network can be used within the private zone. In some cases, since cloud services available in the regional zone can be accessed remotely from private zones over a secure connection, these cloud services can be accessed without having to upgrade or modify the local deployment.

Various embodiments of the present disclosure may also bring the concept of elasticity and utility computing from the cloud computing model to radio-based networks and associated core networks. For example, the disclosed techniques can run core and radio access network functions and associated control plane management functions on cloud provider infrastructure, creating a cloud native core network and/or a cloud native radio access network (RAN). Such core and RAN network functions can be based on the 3rd Generation Partnership Project (3GPP) specifications in some implementations. By providing a cloud native radio-based network, a customer may dynamically scale its radio-based network based on utilization, latency requirements, and/or other factors. Customers may also configure thresholds to receive alerts relating to radio-based network usage and excess capacity usage of their provisioned infrastructure, in order to more effectively manage provisioning of new infrastructure or deprovisioning of existing infrastructure based on their dynamic networking and workload requirements.

As one skilled in the art will appreciate in light of this disclosure, certain embodiments may be capable of achieving certain advantages, including some or all of the following: (1) deploying radio units by UVs or deploying radio-equipped UVs to provide network connectivity to areas lacking sufficient coverage by a radio-based network; (2) automating management of radio units or other hardware by allowing for UVs to charge and/or replace batteries or other hardware components; (3) optimizing travel paths for UVs to provide network coverage to multiple different customers along the travel path; (4) using UVs to provide edge computing capacity to customers in order to meet quality-of-service requirements or other requirements; (5) making otherwise unallocated computing capacity and/or network connectivity of a UV available to customers, thereby improving efficiency of usage; and so forth.

Among the benefits of the present disclosure is the ability to deploy and chain network functions together to deliver an end-to-end service that meets specified constraints and requirements. According to the present disclosure, network functions organized into microservices work together to provide end-to-end connectivity. One set of network functions are part of a radio network, running in cell towers and performing wireless signal to IP conversion. Other network functions run in large data centers performing subscriber related business logic and routing IP traffic to the internet and back. For applications to use the new capabilities of 5G such as low latency communication and reserved bandwidth, both of these types of network functions need to work together to appropriately schedule and reserve wireless spectrum, and perform real time compute and data processing. The presently disclosed techniques provide edge location hardware (as described further below) integrated with network functions that run across the entire network, from cell sites to Internet break-outs, and orchestrate the network functions to meet required Quality of Service (QoS) constraints. This enables an entirely new set of applications that have strict QoS requirements, from factory-based Internet of Things (IoT), to augmented reality (AR), to virtual reality (VR), to game streaming, to autonomous navigation support for connected vehicles, that previously could not run on a mobile network.

The described "elastic 5G" service provides and manages all of the hardware, software, and network functions, required to build a network. In some embodiments, the network functions may be developed and managed by the cloud service provider; however, the described control plane can manage network functions across a range of providers, so that customers can use a single set of APIs to call and manage their choice of network functions on cloud infrastructure. The elastic 5G service beneficially automates the creation of an end-to-end 5G network, from hardware to network functions thus reducing the time to deploy and the operational cost of operating the network. By providing APIs that expose network capabilities, the disclosed elastic 5G service enables applications to simply specify the desired QoS as constraints and then deploys and chains the network functions together to deliver an end-to-end service that meets the specified requirements, thus making it possible to easily build new applications.

The present disclosure describes embodiments relating to the creation and management of a cloud native 5G core and/or a cloud native 5G RAN, and associated control plane components. Cloud native refers to an approach to building and running applications that exploits the advantages of the cloud computing delivery model such as dynamic scalability, distributed computing, and high availability (including geographic distribution, redundancy, and failover). Cloud native refers to how these applications are created and deployed to be suitable for deployment in a public cloud. While cloud native applications can be (and often are) run in the public cloud, they also can be run in an on-premise data center. Some cloud native applications can be containerized, for example, having different parts, functions, or subunits of the application packaged in their own containers, which can be dynamically orchestrated so that each part is actively scheduled and managed to optimize resource utilization. These containerized applications can be architected using a microservices architecture to increase the overall agility and maintainability of the applications.

In a microservices architecture, an application is arranged as a collection of smaller subunits ("microservices") that can be deployed and scaled independently from one another, and which can communicate with one another over a network. These microservices are typically fine-grained, in that they have specific technical and functional granularity, and often implement lightweight communication protocols. The microservices of an application can perform different functions from one another, can be independently deployable, and may use different programming languages, databases, and hardware/software environments from one another. Decomposing an application into smaller services beneficially improves modularity of the application, enables replacement of individual microservices as needed, and parallelizes development by enabling teams to develop, deploy, and maintain their microservices independently from one another. A microservice may be deployed using a virtual machine, container, or serverless function, in some examples. The disclosed core and RAN software may follow a microservices architecture such that the described radio-based networks are composed of independent subunits that can be deployed and scaled on demand.

Turning now to FIG. 1A, shown is an example of a communication network 100 that is deployed and managed according to various embodiments of the present disclosure. The communication network 100 includes a radio-based network (RBN) 103, which may correspond to a cellular network such as a High Speed Packet Access (HSPA) network, a fourth-generation (4G) Long-Term Evolution (LTE) network, a fifth-generation (5G) network, a 4G-5G hybrid core with both 4G and 5G RANs, a sixth-generation (6G) network, or another network that provides wireless network access. The radio-based network 103 may be operated by a cloud service provider for an enterprise, a non-profit, a school system, a governmental entity, or another organization. Although referred to as a private network, the radio-based network 103 may use private network addresses or public network addresses in various embodiments.

Various deployments of the radio-based network 103 can include one or more of a core network and a RAN network, as well as a control plane for running the core and/or RAN network on cloud provider infrastructure. As described above, these components can be developed in a cloud native fashion, for example using a microservices architecture, such that centralized control and distributed processing is used to scale traffic and transactions efficiently. These components may be based on the 3GPP specifications by following an application architecture in which control plane and user plane processing is separated (CUPS Architecture).

The radio-based network 103 provides wireless network access to a plurality of wireless devices 106, which may be mobile devices or fixed location devices. In various examples, the wireless devices 106 may include smartphones, connected vehicles, IoT devices, sensors, machinery (such as in a manufacturing facility), hotspots, and other devices. The wireless devices 106 are sometimes referred to as user equipment (UE) or customer premises equipment (CPE).

The radio-based network 103 can include capacity provisioned on one or more radio access networks (RANs) that provide the wireless network access to the plurality of wireless devices 106 through a plurality of cells 109. The RANs may be operated by different communication service providers. Each of the cells 109 may be equipped with one or more antennas and one or more radio units that send and receive wireless data signals to and from the wireless devices 106. The antennas may be configured for one or more frequency bands, and the radio units may also be frequency agile or frequency adjustable. The antennas may be associated with a certain gain or beamwidth in order to focus a signal in a particular direction or azimuthal range, potentially allowing reuse of frequencies in a different direction. Further, the antennas may be horizontally, vertically, or circularly polarized. In some examples, a radio unit may utilize multiple-input, multiple-output (MIMO) technology to send and receive signals. As such, the RAN implements a radio access technology to enable radio connection with wireless devices 106, and provides connection with the radio-based network's core network. Components of the RAN include a base station and antennas that cover a given physical area, as well as required core network items for managing connections to the RAN.

As shown, various cells 109 may correspond to traditional base stations 110, or the cells 109 may correspond to UVs 111 that can provide edge computing capacity and/or network connectivity for the radio-based network 103. Although the UVs 111 are depicted as being UAVs or drones, it will be appreciated that various embodiments may use terrestrial UVs, or a combination of terrestrial and aerial UVs, and that the utilized UVs may also be capable of both aerial and terrestrial movement. The UVs 111 may be capable of autonomous navigation, in some implementations. The UVs 111 may correspond to a fleet of a plurality of UVs 111 that may be deployed by a provider to service multiple customers or radio-based networks 103. In some cases, the UVs 111 may forward or backhaul their communications by communicating with other UVs 111, or the UVs 111 may communicate with a fixed base station or with a satellite station to forward or backhaul their communications. In some embodiments, the UVs 111 may be configured to deliver a radio unit such as a base station or a repeater for use in the radio-based network 103.

Data traffic is often routed through a fiber transport network consisting of multiple hops of layer 3 routers (e.g., at aggregation sites) to the core network. The core network is typically housed in one or more data centers. The core network typically aggregates data traffic from end devices, authenticates subscribers and devices, applies personalized policies, and manages the mobility of the devices before routing the traffic to operator services or the Internet. A 5G Core for example can be decomposed into a number of microservice elements with control and user plane separation. Rather than physical network elements, a 5G Core can comprise virtualized, software-based network functions (deployed for example as microservices) and can therefore be instantiated within Multi-access Edge Computing (MEC) cloud infrastructures. The network functions of the core network can include a User Plane Function (UPF), Access and Mobility Management Function (AMF), and Session Management Function (SMF), described in more detail below. For data traffic destined for locations outside of the communication network 100, network functions typically include a firewall through which traffic can enter or leave the communication network 100 to external networks such as the Internet or a cloud provider network. Note that in some embodiments, the communication network 100 can include facilities to permit traffic to enter or leave from sites further downstream from the core network (e.g., at an aggregation site or radio-based network 103).

The UPF provides an interconnect point between the mobile infrastructure and the Data Network (DN), i.e., encapsulation and decapsulation of General Packet Radio Service (GPRS) tunneling protocol for the user plane (GTP-U). The UPF can also provide a session anchor point for providing mobility within the RAN, including sending one or more end marker packets to the RAN base stations. The UPF can also handle packet routing and forwarding, including directing flows to specific data networks based on traffic matching filters. Another feature of the UPF includes per-flow or per-application QoS handling, including transport level packet marking for uplink (UL) and downlink (DL), and rate limiting. The UPF can be implemented as a cloud native network function using modern microservices methodologies, for example being deployable within a serverless framework (which abstracts away the underlying infrastructure that code runs on via a managed service).

The AMF can receive the connection and session information from the wireless devices 106 or the RAN and can handle connection and mobility management tasks. For example, the AMF can manage handovers between base stations in the RAN. In some examples the AMF can be considered as the access point to the 5G core, by terminating certain RAN control plane and wireless device 106 traffic. The AMF can also implement ciphering and integrity protection algorithms.

The SMF can handle session establishment or modification, for example by creating, updating and removing Protocol Data Unit (PDU) sessions and managing session context within the UPF. The SMF can also implement Dynamic Host Configuration Protocol (DHCP) and IP Address Management (IPAM). The SMF can be implemented as a cloud native network function using modern microservices methodologies.

Various network functions to implement the radio-based network 103 may be deployed in distributed computing devices 112, which may correspond to general-purpose computing devices configured to perform the network functions. For example, the distributed computing devices 112 may execute one or more virtual machine instances that are configured in turn to execute one or more services that perform the network functions. In one embodiment, the distributed computing devices 112 are ruggedized machines that are deployed at each cell site. In some cases, network functions may be performed in the UVs 111 with the edge computing capacity within the UV 111.

By contrast, one or more centralized computing devices 115 may perform various network functions at a central site operated by the customer. For example, the centralized computing devices 115 may be centrally located on premises of the customer in a conditioned server room. The centralized computing devices 115 may execute one or more virtual machine instances that are configured in turn to execute one or more services that perform the network functions.

In one or more embodiments, network traffic from the radio-based network 103 is backhauled to one or more core computing devices 118 that may be located at one or more data centers situated remotely from the customer's site. The core computing devices 118 may also perform various network functions, including routing network traffic to and from the network 121, which may correspond to the Internet and/or other external public or private networks. The core computing devices 118 may perform functionality related to the management of the communication network 100 (e.g., billing, mobility management, etc.) and transport functionality to relay traffic between the communication network 100 and other networks.

Figure 1B:
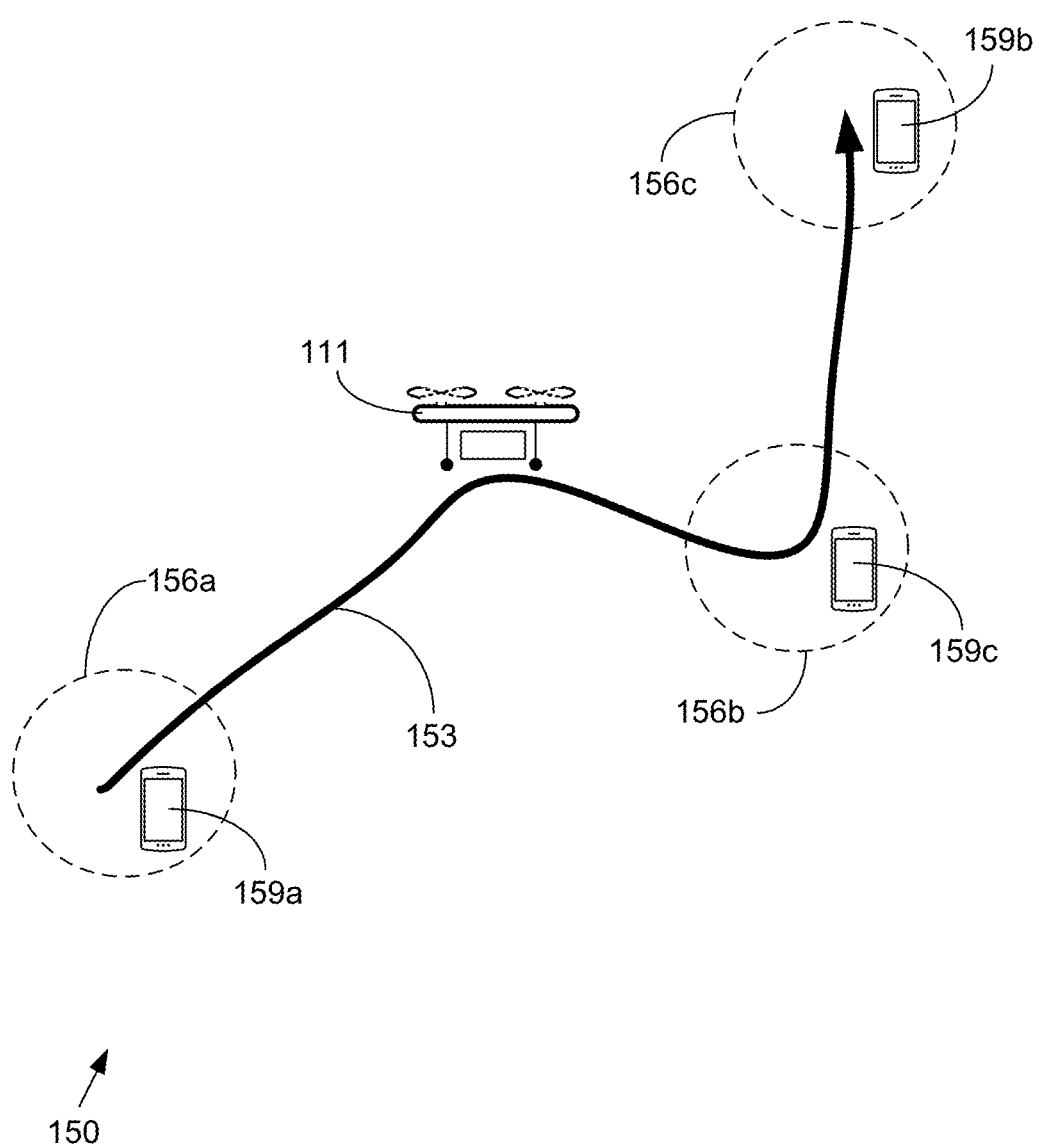
FIG. 1B is an example scenario involving an unmanned vehicle providing network connectivity and/or edge computing capacity along a travel path in accordance with one or more embodiments.

Moving on to FIG. 1B, shown is an example scenario 150 involving a UV 111 providing network connectivity and/or edge computing capacity along a travel path 153 in accordance with one or more embodiments. The travel path 153 may correspond to a flight path when the UV 111 is a drone or other unmanned aerial vehicle. At the start of the travel path 153, the UV 111 provides network connectivity over a first coverage area 156a to a first customer 159a. The customers 159 represented herein may be one or more wireless devices 106 (FIG. 1A) or may represent radio-based networks 103 (FIG. 1A). After the time period allocated for the first customer 159a expires, or based on other factors such as remaining fuel, distance from a base, or demand, the UV 111 flies along the travel path 153 to provide coverage to the second customer 159b.

While on the way to the second customer 159b, a third customer 159c may request network connectivity and/or edge computing capacity from the UV 111. This otherwise unallocated capacity may be provided to the third customer 159c at a relatively lower expense. However, in some cases, multiple customers 159 may bid on the otherwise unallocated capacity, as the second customer 159b may have bid on the allocated capacity, and the demand may increase the expense to the customer 159 as the maximum bid may be accepted. Depending on the bid, the UV 111 may have its travel path 153 altered and/or the UV 111 may slow its travel speed along the travel path 153 in order to provide the second coverage 156b to the third customer 159c. As shown, the travel path 153 of the UV 111 in this example detours away from a straight line between the first customer 159a and the second customer 159b in order to provide the second coverage 156b to the third customer 159c.

The second coverage 156b is provided only for a time period, which may be extendable in some cases. In some cases, the second coverage 156b is provided only while the UV 111 is traveling, while in other cases, the UV 111 may temporarily land or stay in a fixed position to provide the second coverage 156b for the time period. The UV 111 then continues along the travel path 153 to ultimately provide the third coverage 156c to the second customer 159b on schedule. Although the UV 111 may stop at a particular location to provide coverage, the location may be determined to be optimal based upon an analysis of a variety of parameters including signal strength to one or more wireless devices 106 of the customer 159, interference, docking or landing site availability, remaining fuel, geographical regulations, proximity to a travel path 153 to a subsequent customer 159, proximity to a home base, and/or other parameters.

Figure 1C:
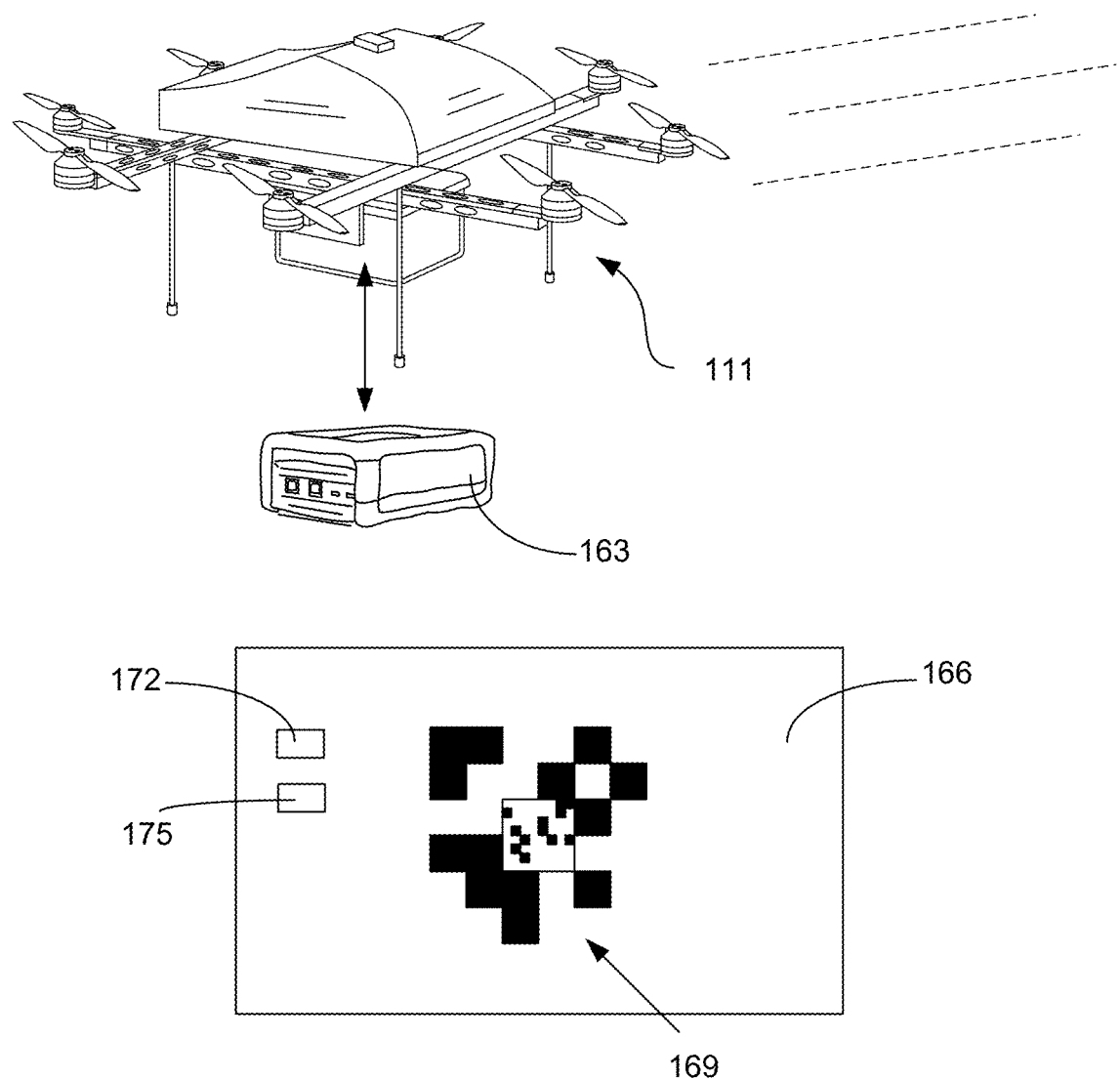
FIG. 1C shown is an example scenario of an unmanned vehicle delivering a radio unit in accordance with various embodiments of the present disclosure.

Continuing to FIG. 1C, shown is an example scenario 160 of a UV 111 delivering a radio unit 163. The UV 111, though depicted as an octocopter, may correspond to a quadcopter, a fixed wing aircraft, a land-based tracked or wheeled vehicle, or another type of UV. The UV 111 may be under full autonomous control or may be partially controlled via manual intervention. The UV 111 carries the radio unit 163 as a payload until the UV 111 reaches the landing site 166.

The radio unit 163 corresponds to a ruggedized computing device that incorporates a base station or repeater for a radio-based network 103 (FIG. 1A). The radio unit 163 may be employed in outdoor or exterior environments such as rooftops or in yards. To this end, the radio unit 163 may include resistance to water and extreme temperatures. The radio unit 163 may also include a shock absorbing chassis in order to withstand rough landings. The radio unit 163 may incorporate data storage on the order of terabytes or petabytes and may also include substantial computation or processing capacity. The radio unit 163 may include battery power, external power connections, and/or solar cells. It is noted that certain components of the radio unit 163 (e.g., batteries, data storage components, processing components, secure processing components, etc.) may be exchangeable by the UV 111.

While the radio unit 163 may be capable of functioning at any landing site 166, the landing site 166 in some embodiments may correspond to a docking station that enables the radio unit 163 to connect to power or network connectivity sources. The example landing site 166 includes one or more fiducials 169 to guide the landing and orientation of the UV 111. In one example, a two-dimensional bar code such as a quick response (QR) code is used as a fiducial 169. The example landing site 166 may include a power supply port 172 and/or a network port 175. The power supply port 172 may support wired and/or wireless power transfer and may correspond to a power receipt port on the UV 111 and/or the radio unit 163. The network port 175 may support wired connections (e.g., optical fiber, RJ-45, etc.) and/or wireless connections (e.g., Bluetooth, Wi-Fi, near-field communication (NFC), infrared, etc.) to the UV 111 and/or the radio unit 163. The UV 111 may be configured to articulate itself and/or the radio unit 163 in order to successfully interface with the ports 172, 175.

Although FIG. 1C depicts an example where the radio unit 163 is detachable and deliverable by the UV 111, it is understood that the radio unit 163 may function and offer network connectivity and/or edge computing capacity while carried as a payload of the UV 111. Moreover, in some implementations, the radio unit 163 may be integrated as a component of the UV 111.

Figure 2A:
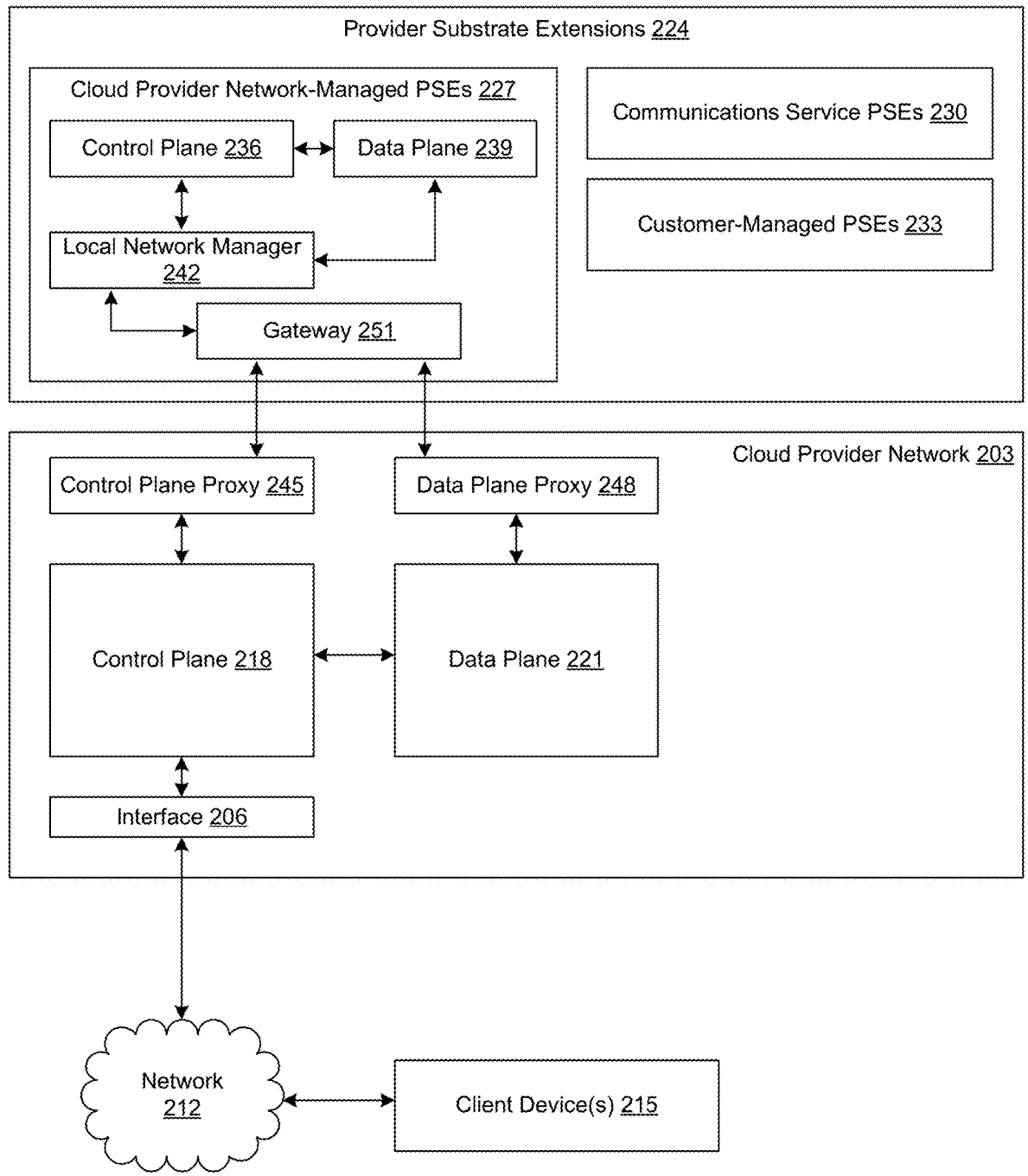
FIG. 2A illustrates an example of a networked environment including a cloud provider network and further including various provider substrate extensions of the cloud provider network, which may be used in various locations within the communication network of FIG. 1A, according to some embodiments of the present disclosure.

FIG. 2A illustrates an example of a networked environment 200 including a cloud provider network 203 and further including various provider substrate extensions of the cloud provider network 203, which may be used in combination with on-premise customer deployments within the communication network 100 of FIG. 1A, according to some embodiments. A cloud provider network 203 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 203 can provide on-demand, scalable computing platforms to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, API, software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

As indicated above, users can connect to virtualized computing devices and other cloud provider network 203 resources and services, and configure and manage telecommunication networks such as 5G networks, using various interfaces 206 (e.g., APIs) via intermediate network(s) 212. An API refers to an interface 206 and/or communication protocol between a client device 215 and a server, such that if the client makes a request in a predefined format, the client should receive a response in a specific format or cause a defined action to be initiated. In the cloud provider network context, APIs provide a gateway for customers to access cloud infrastructure by allowing customers to obtain data from or cause actions within the cloud provider network 203, enabling the development of applications that interact with resources and services hosted in the cloud provider network 203. APIs can also enable different services of the cloud provider network 203 to exchange data with one another. Users can choose to deploy their virtual computing systems to provide network-based services for their own use and/or for use by their customers or clients.

The cloud provider network 203 can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network 203, for example it may not be possible to route from a substrate network address to an address in a production network that runs services of the cloud provider, or to a customer network that hosts customer resources.

The cloud provider network 203 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of an overlay internet protocol (IP) and a network identifier to an substrate IP so that the distributed substrate computing devices can look up where to send packets.

To illustrate, each physical host device (e.g., a compute server, a block store server, an object store server, a control server) can have an IP address in the substrate network. Hardware virtualization technology can enable multiple operating systems to run concurrently on a host computer, for example as virtual machines (VMs) on a compute server. A hypervisor, or virtual machine monitor (VMM), on a host allocates the host's hardware resources amongst various VMs on the host and monitors the execution of the VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 203. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network 203 for routing packets between endpoints.

As illustrated, the traffic and operations of the cloud provider network substrate may broadly be subdivided into two categories in various embodiments: control plane traffic carried over a logical control plane 218 and data plane operations carried over a logical data plane 221. While the data plane 221 represents the movement of user data through the distributed computing system, the control plane 218 represents the movement of control signals through the distributed computing system. The control plane 218 generally includes one or more control plane components or services distributed across and implemented by one or more control servers. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane 221 includes customer resources that are implemented on the cloud provider network (e.g., computing instances, containers, block storage volumes, databases, file storage). Data plane traffic generally includes non-administrative operations, such as transferring data to and from the customer resources.

The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the cloud provider network 203 include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane 221 can include one or more compute servers, which may be bare metal (e.g., single tenant) or may be virtualized by a hypervisor to run multiple VMs (sometimes referred to as "instances") or microVMs for one or more customers. These compute servers can support a virtualized computing service (or "hardware virtualization service") of the cloud provider network 203. The virtualized computing service may be part of the control plane 218, allowing customers to issue commands via an interface 206 (e.g., an API) to launch and manage compute instances (e.g., VMs, containers) for their applications. The virtualized computing service may offer virtual compute instances with varying computational and/or memory resources. In one embodiment, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane 221 can also include one or more block store servers, which can include persistent storage for storing volumes of customer data as well as software for managing these volumes. These block store servers can support a managed block storage service of the cloud provider network 203. The managed block storage service may be part of the control plane 218, allowing customers to issue commands via the interface 206 (e.g., an API) to create and manage volumes for their applications running on compute instances. The block store servers include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte (TB) or more in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the cloud provider network 203, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane 221 can also include one or more object store servers, which represent another type of storage within the cloud provider network 203. The object storage servers include one or more servers on which data is stored as objects within resources referred to as buckets and can be used to support a managed object storage service of the cloud provider network 203. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that represent a point-in-time view of the data of a volume.

A provider substrate extension 224 ("PSE") provides resources and services of the cloud provider network 203 within a separate network, such as a telecommunications network, thereby extending functionality of the cloud provider network 203 to new locations (e.g., for reasons related to latency in communications with customer devices, legal compliance, security, etc.). In some examples, a UV 111 (FIG. 1A) or a radio unit 163 (FIG. 1C) may include a provider substrate extension 224 in order to execute customer workloads. In some implementations, a PSE 224 can be configured to provide capacity for cloud-based workloads to run within the telecommunications network. In some implementations, a PSE 224 can be configured to provide the core and/or RAN functions of the telecommunications network, and may be configured with additional hardware (e.g., radio access hardware). Some implementations may be configured to allow for both, for example by allowing capacity unused by core and/or RAN functions to be used for running cloud-based workloads.

As indicated, such provider substrate extensions 224 can include cloud provider network-managed provider substrate extensions 227 (e.g., formed by servers located in a cloud provider-managed facility separate from those associated with the cloud provider network 203), communications service provider substrate extensions 230 (e.g., formed by servers associated with communications service provider facilities), customer-managed provider substrate extensions 233 (e.g., formed by servers located on-premise in a customer or partner facility), among other possible types of substrate extensions.

As illustrated in the example provider substrate extension 224, a provider substrate extension 224 can similarly include a logical separation between a control plane 236 and a data plane 239, respectively extending the control plane 218 and data plane 221 of the cloud provider network 203. The provider substrate extension 224 may be pre-configured, e.g., by the cloud provider network operator, with an appropriate combination of hardware with software and/or firmware elements to support various types of computing-related resources, and to do so in a manner that mirrors the experience of using the cloud provider network 203. For example, one or more provider substrate extension location servers can be provisioned by the cloud provider for deployment within a provider substrate extension 224. As described above, the cloud provider network 203 may offer a set of predefined instance types, each having varying types and quantities of underlying hardware resources. Each instance type may also be offered in various sizes. In order to enable customers to continue using the same instance types and sizes in a provider substrate extension 224 as they do in the region, the servers can be heterogeneous servers. A heterogeneous server can concurrently support multiple instance sizes of the same type and may be also reconfigured to host whatever instance types are supported by its underlying hardware resources. The reconfiguration of the heterogeneous server can occur on-the-fly using the available capacity of the servers, that is, while other VMs are still running and consuming other capacity of the provider substrate extension location servers. This can improve utilization of computing resources within the edge location by allowing for better packing of running instances on servers, and also provides a seamless experience regarding instance usage across the cloud provider network 203 and the cloud provider network-managed provider substrate extension 227.

The provider substrate extension servers can host one or more compute instances. Compute instances can be VMs, or containers that package up code and all its dependencies, so that an application can run quickly and reliably across computing environments (e.g., including VMs and microVMs). In addition, the servers may host one or more data volumes, if desired by the customer. In the region of a cloud provider network 203, such volumes may be hosted on dedicated block store servers. However, due to the possibility of having a significantly smaller capacity at a provider substrate extension 224 than in the region, an optimal utilization experience may not be provided if the provider substrate extension 224 includes such dedicated block store servers. Accordingly, a block storage service may be virtualized in the provider substrate extension 224, such that one of the VMs runs the block store software and stores the data of a volume. Similar to the operation of a block storage service in the region of a cloud provider network 203, the volumes within a provider substrate extension 224 may be replicated for durability and availability. The volumes may be provisioned within their own isolated virtual network within the provider substrate extension 224. The compute instances and any volumes collectively make up a data plane 239 extension of the provider network data plane 221 within the provider substrate extension 224.

The servers within a provider substrate extension 224 may, in some implementations, host certain local control plane components, for example, components that enable the provider substrate extension 224 to continue functioning if there is a break in the connection back to the cloud provider network 203. Examples of these components include a migration manager that can move compute instances between provider substrate extension servers if needed to maintain availability, and a key value data store that indicates where volume replicas are located. However, generally the control plane 236 functionality for a provider substrate extension 224 will remain in the cloud provider network 203 in order to allow customers to use as much resource capacity of the provider substrate extension 224 as possible.

The migration manager may have a centralized coordination component that runs in the region, as well as local controllers that run on the PSE servers (and servers in the cloud provider's data centers). The centralized coordination component can identify target edge locations and/or target hosts when a migration is triggered, while the local controllers can coordinate the transfer of data between the source and target hosts. The described movement of the resources between hosts in different locations may take one of several forms of migration. Migration refers to moving virtual machine instances (and/or other resources) between hosts in a cloud computing network, or between hosts outside of the cloud computing network and hosts within the cloud. There are different types of migration including live migration and reboot migration. During a reboot migration, the customer experiences an outage and an effective power cycle of their virtual machine instance. For example, a control plane service can coordinate a reboot migration workflow that involves tearing down the current domain on the original host and subsequently creating a new domain for the virtual machine instance on the new host. The instance is rebooted by being shut down on the original host and booted up again on the new host.

Live migration refers to the process of moving a running virtual machine or application between different physical machines without significantly disrupting the availability of the virtual machine (e.g., the down time of the virtual machine is not noticeable by the end user). When the control plane executes a live migration workflow it can create a new "inactive" domain associated with the instance, while the original domain for the instance continues to run as the "active" domain. Memory (including any in-memory state of running applications), storage, and network connectivity of the virtual machine are transferred from the original host with the active domain to the destination host with the inactive domain. The virtual machine may be briefly paused to prevent state changes while transferring memory contents to the destination host. The control plane can transition the inactive domain to become the active domain and demote the original active domain to become the inactive domain (sometimes referred to as a "flip"), after which the inactive domain can be discarded.

Techniques for various types of migration involve managing the critical phase—the time when the virtual machine instance is unavailable to the customer—which should be kept as short as possible. In the presently disclosed migration techniques this can be especially challenging, as resources are being moved between hosts in geographically separate locations which may be connected over one or more intermediate networks. For live migration, the disclosed techniques can dynamically determine an amount of memory state data to pre-copy (e.g., while the instance is still running on the source host) and to post-copy (e.g., after the instance begins running on the destination host), based for example on latency between the locations, network bandwidth/usage patterns, and/or on which memory pages are used most frequently by the instance. Further, a particular time at which the memory state data is transferred can be dynamically determined based on conditions of the network between the locations. This analysis may be performed by a migration management component in the region, or by a migration management component running locally in the source edge location. If the instance has access to virtualized storage, both the source domain and target domain can be simultaneously attached to the storage to enable uninterrupted access to its data during the migration and in the case that rollback to the source domain is required.

Server software running at a provider substrate extension 224 may be designed by the cloud provider to run on the cloud provider substrate network, and this software may be enabled to run unmodified in a provider substrate extension 224 by using local network manager(s) 242 to create a private replica of the substrate network within the edge location (a "shadow substrate"). The local network manager(s) 242 can run on provider substrate extension 224 servers and bridge the shadow substrate with the provider substrate extension 224 network, for example, by acting as a virtual private network (VPN) endpoint or endpoints between the provider substrate extension 224 and the proxies 245, 248 in the cloud provider network 203 and by implementing the mapping service (for traffic encapsulation and decapsulation) to relate data plane traffic (from the data plane proxies 248) and control plane traffic (from the control plane proxies 245) to the appropriate server(s). By implementing a local version of the provider network's substrate-overlay mapping service, the local network manager(s) 242 allow resources in the provider substrate extension 224 to seamlessly communicate with resources in the cloud provider network 203. In some implementations, a single local network manager 242 can perform these actions for all servers hosting compute instances in a provider substrate extension 224. In other implementations, each of the server hosting compute instances may have a dedicated local network manager 242. In multi-rack edge locations, inter-rack communications can go through the local network managers 242, with local network managers maintaining open tunnels to one another.

Provider substrate extension locations can utilize secure networking tunnels through the provider substrate extension 224 network to the cloud provider network 203, for example, to maintain security of customer data when traversing the provider substrate extension 224 network and any other intermediate network (which may include the public internet). Within the cloud provider network 203, these tunnels are composed of virtual infrastructure components including isolated virtual networks (e.g., in the overlay network), control plane proxies 245, data plane proxies 248, and substrate network interfaces. Such proxies 245, 248 may be implemented as containers running on compute instances. In some embodiments, each server in a provider substrate extension 224 location that hosts compute instances can utilize at least two tunnels: one for control plane traffic (e.g., Constrained Application Protocol (CoAP) traffic) and one for encapsulated data plane traffic. A connectivity manager (not shown) within the cloud provider network 203 manages the cloud provider network-side lifecycle of these tunnels and their components, for example, by provisioning them automatically when needed and maintaining them in a healthy operating state. In some embodiments, a direct connection between a provider substrate extension 224 location and the cloud provider network 203 can be used for control and data plane communications. As compared to a VPN through other networks, the direct connection can provide constant bandwidth and more consistent network performance because of its relatively fixed and stable network path.

A control plane (CP) proxy 245 can be provisioned in the cloud provider network 203 to represent particular host(s) in an edge location. CP proxies 245 are intermediaries between the control plane 218 in the cloud provider network 203 and control plane targets in the control plane 236 of a provider substrate extension 224. That is, CP proxies 245 provide infrastructure for tunneling management API traffic destined for provider substrate extension servers out of the region substrate and to the provider substrate extension 224. For example, a virtualized computing service of the cloud provider network 203 can issue a command to a VMM of a server of a provider substrate extension 224 to launch a compute instance. A CP proxy 245 maintains a tunnel (e.g., a VPN) to a local network manager 242 of the provider substrate extension 224. The software implemented within the CP proxies 245 ensures that only well-formed API traffic leaves from and returns to the substrate. CP proxies 245 provide a mechanism to expose remote servers on the cloud provider substrate while still protecting substrate security materials (e.g., encryption keys, security tokens) from leaving the cloud provider network 203. The one-way control plane traffic tunnel imposed by the CP proxies 245 also prevents any (potentially compromised) devices from making calls back to the substrate. CP proxies 245 may be instantiated one-for-one with servers at a provider substrate extension 224 or may be able to manage control plane traffic for multiple servers in the same provider substrate extension 224.

A data plane (DP) proxy 248 can also be provisioned in the cloud provider network 203 to represent particular server(s) in a provider substrate extension 224. The DP proxy 248 acts as a shadow or anchor of the server(s) and can be used by services within the cloud provider network 203 to monitor the health of the host (including its availability, used/free compute and capacity, used/free storage and capacity, and network bandwidth usage/availability). The DP proxy 248 also allows isolated virtual networks to span provider substrate extensions 224 and the cloud provider network 203 by acting as a proxy for server(s) in the cloud provider network 203. Each DP proxy 248 can be implemented as a packet-forwarding compute instance or container. As illustrated, each DP proxy 248 can maintain a VPN tunnel with a local network manager 242 that manages traffic to the server(s) that the DP proxy 248 represents. This tunnel can be used to send data plane traffic between the provider substrate extension server(s) and the cloud provider network 203. Data plane traffic flowing between a provider substrate extension 224 and the cloud provider network 203 can be passed through DP proxies 248 associated with that provider substrate extension 224. For data plane traffic flowing from a provider substrate extension 224 to the cloud provider network 203, DP proxies 248 can receive encapsulated data plane traffic, validate it for correctness, and allow it to enter into the cloud provider network 203. DP proxies 248 can forward encapsulated traffic from the cloud provider network 203 directly to a provider substrate extension 224.

Local network manager(s) 242 can provide secure network connectivity with the proxies 245, 248 established in the cloud provider network 203. After connectivity has been established between the local network manager(s) 242 and the proxies 245, 248, customers may issue commands via the interface 206 to instantiate compute instances (and/or perform other operations using compute instances) using provider substrate extension resources in a manner analogous to the way in which such commands would be issued with respect to compute instances hosted within the cloud provider network 203. From the perspective of the customer, the customer can now seamlessly use local resources within a provider substrate extension 224 (as well as resources located in the cloud provider network 203, if desired). The compute instances set up on a server at a provider substrate extension 224 may communicate both with electronic devices located in the same network, as well as with other resources that are set up in the cloud provider network 203, as desired. A local gateway 251 can be implemented to provide network connectivity between a provider substrate extension 224 and a network associated with the extension (e.g., a communications service provider network in the example of a communications service provider substrate extension 230).

There may be circumstances that necessitate the transfer of data between the object storage service and a provider substrate extension (PSE) 224. For example, the object storage service may store machine images used to launch VMs, as well as snapshots representing point-in-time backups of volumes. The object gateway can be provided on a PSE server or a specialized storage device, and provide customers with configurable, per-bucket caching of object storage bucket contents in their PSE 224 to minimize the impact of PSE-region latency on the customer's workloads. The object gateway can also temporarily store snapshot data from snapshots of volumes in the PSE 224 and then sync with the object servers in the region when possible. The object gateway can also store machine images that the customer designates for use within the PSE 224 or on the customer's premises. In some implementations, the data within the PSE 224 may be encrypted with a unique key, and the cloud provider can limit keys from being shared from the region to the PSE 224 for security reasons. Accordingly, data exchanged between the object store servers and the object gateway may utilize encryption, decryption, and/or re-encryption in order to preserve security boundaries with respect to encryption keys or other sensitive data. The transformation intermediary can perform these operations, and a PSE bucket can be created (on the object store servers) to store snapshot data and machine image data using the PSE encryption key.

In the manner described above, a PSE 224 forms an edge location, in that it provides the resources and services of the cloud provider network 203 outside of a traditional cloud provider data center and closer to customer devices. An edge location, as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as "far zones" (due to being far from other availability zones) or "near zones" (due to being near to customer workloads). A near zone may be connected in various ways to a publicly accessible network such as the Internet, for example directly, via another network, or via a private connection to a region. Although typically a near zone would have more limited capacity than a region, in some cases a near zone may have substantial capacity, for example thousands of racks or more.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-access edge computing (MEC) site having physical infrastructure spread across telecommunication data centers, telecommunication aggregation sites, and/or telecommunication base stations within the telecommunication network. In the on-premise example, the limited capacity of the outpost may be available for use only by the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone of the provider network. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network 203, close to customer devices and/or workloads.

In the example of FIG. 1A, the UVs 111, the distributed computing devices 112 (FIG. 1A), the centralized computing devices 115 (FIG. 1A), and the core computing devices 118 (FIG. 1A) may be implemented as provider substrate extensions 224 of the cloud provider network 203. The installation or siting of provider substrate extensions 224 within a communication network 100 can vary subject to the particular network topology or architecture of the communication network 100. Provider substrate extensions 224 can generally be connected anywhere the communication network 100 can break out packet-based traffic (e.g., IP based traffic). Additionally, communications between a given provider substrate extension 224 and the cloud provider network 203 typically securely transit at least a portion of the communication network 100 (e.g., via a secure tunnel, virtual private network, a direct connection, etc.).

In 5G wireless network development efforts, edge locations may be considered a possible implementation of Multi-access Edge Computing (MEC). Such edge locations can be connected to various points within a 5G network that provide a breakout for data traffic as part of the User Plane Function (UPF). Older wireless networks can incorporate edge locations as well. In 3G wireless networks, for example, edge locations can be connected to the packet-switched network portion of a communication network 100, such as to a Serving General Packet Radio Services Support Node (SGSN) or to a Gateway General Packet Radio Services Support Node (GGSN). In 4G wireless networks, edge locations can be connected to a Serving Gateway (SGW) or Packet Data Network Gateway (PGW) as part of the core network or evolved packet core (EPC). In some embodiments, traffic between a provider substrate extension 224 and the cloud provider network 203 can be broken out of the communication network 100 without routing through the core network.

In some embodiments, provider substrate extensions 224 can be connected to more than one communication network associated with respective customers. For example, when two communication networks of respective customers share or route traffic through a common point, a provider substrate extension 224 can be connected to both networks. For example, each customer can assign some portion of its network address space to the provider substrate extension 224, and the provider substrate extension 224 can include a router or gateway 251 that can distinguish traffic exchanged with each of the communication networks 100. For example, traffic destined for the provider substrate extension 224 from one network might have a different destination IP address, source IP address, and/or virtual local area network (VLAN) tag than traffic received from another network. Traffic originating from the provider substrate extension 224 to a destination on one of the networks can be similarly encapsulated to have the appropriate VLAN tag, source IP address (e.g., from the pool allocated to the provider substrate extension 224 from the destination network address space) and destination IP address.

Figure 2B:
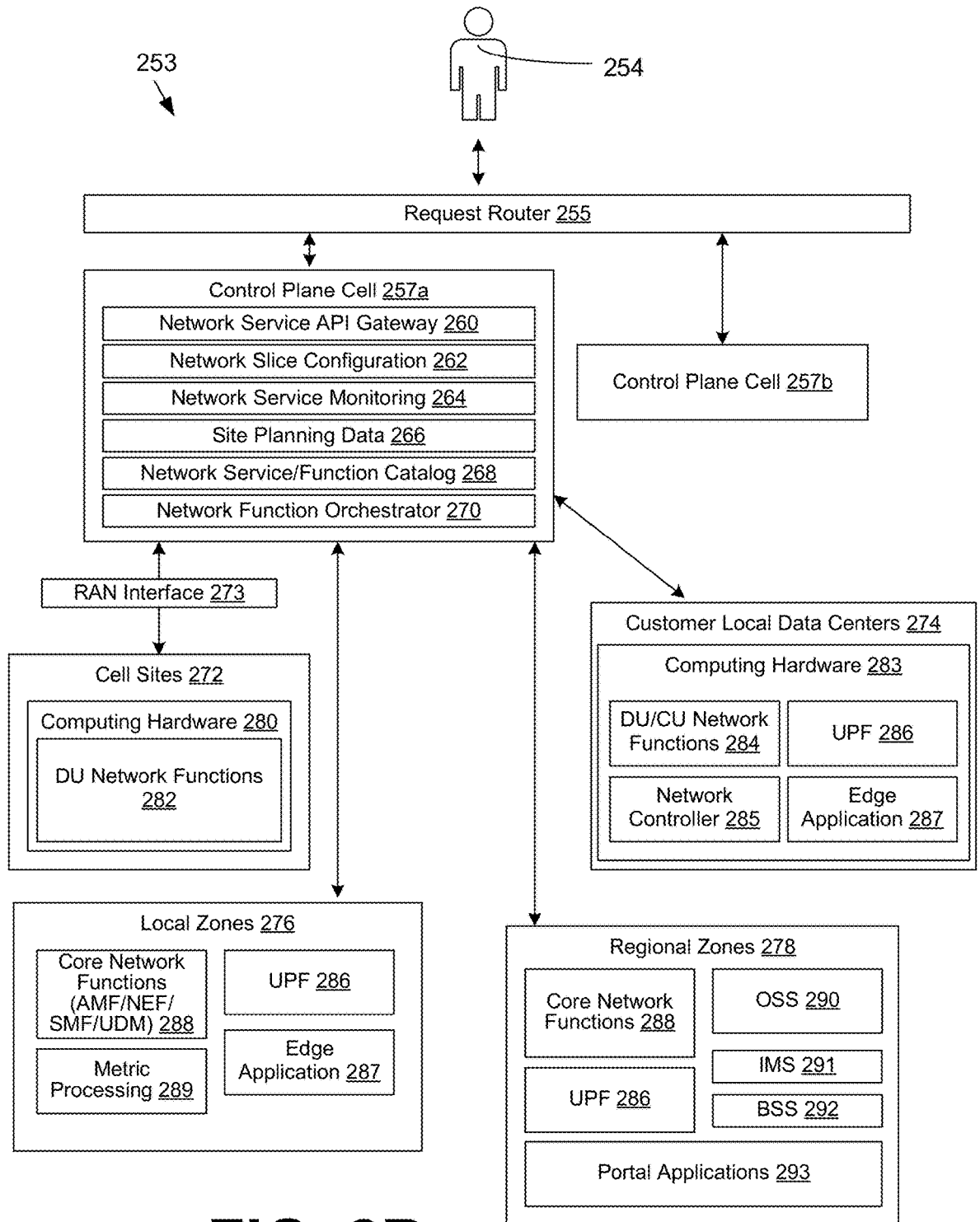
FIG. 2B depicts an example of cellularization and geographic distribution of the communication network of FIG. 1A.

FIG. 2B depicts an example 253 of cellularization and geographic distribution of the communication network 100 (FIG. 1A) for providing highly available user plane functions (UPFs). In FIG. 2B, a user device 254 communicates with a request router 255 to route a request to one of a plurality of control plane cells 257a and 257b. Each control plane cell 257 may include a network service API gateway 260, a network slice configuration 262, a function for network service monitoring 264, site planning data 266 (including layout, device type, device quantities, etc. that describe a customer's site requirements), a network service/function catalog 268, a network function orchestrator 270, and/or other components. The larger control plane can be divided into cells in order to reduce the likelihood that large scale errors will affect a wide range of customers, for example by having one or more cells per customer, per network, or per region that operate independently.

The network service/function catalog 268 is also referred to as the NF Repository Function (NRF). In a Service Based Architecture (SBA) 5G network, the control plane functionality and common data repositories can be delivered by way of a set of interconnected network functions built using a microservices architecture. The NRF can maintain a record of available NF instances and their supported services, allowing other NF instances to subscribe and be notified of registrations from NF instances of a given type. The NRF thus can support service discovery by receipt of discovery requests from NF instances, and details which NF instances support specific services. The network function orchestrator 270 can perform NF lifecycle management including instantiation, scale-out/in, performance measurements, event correlation, and termination. The network function orchestrator 270 can also onboard new NFs, manage migration to new or updated versions of existing NFs, identify NF sets that are suitable for a particular network slice or larger network, and orchestrate NFs across different computing devices and sites that make up the radio-based network 103 (FIG. 1A).

The control plane cell 257 may be in communication with one or more cell sites 272 by way of a RAN interface 273, one or more customer local data centers 274, one or more local zones 276, and one or more regional zones 278. The RAN interface 273 may include an application programming interface (API) that facilitates provisioning or releasing capacity in a RAN operated by a third-party communication service provider at a cell site 272. The cell sites 272, which can include UVs 111 (FIG. 1A) and/or radio units 163 (FIG. 1C) delivered by UVs 111, include computing hardware 280 that executes one or more distributed unit (DU) network functions 282. The customer local data centers 274 include computing hardware 283 that execute one or more DU or central unit (CU) network functions 284, a network controller 285, a UPF 286, one or more edge applications 287 corresponding to customer workloads, and/or other components.

The local zones 276, which may be in a data center operated by a cloud service provider, may execute one or more core network functions 288, such as an AMF, an SMF, a network exposure function (NEF) that securely exposes the services and capabilities of other network functions, a unified data management (UDM) function that manages subscriber data for authorization, registration, and mobility management. The local zones 276 may also execute a UPF 286, a service for metric processing 289, and one or more edge applications 287.

The regional zones 278, which may be in a data center operated by a cloud service provider 203, may execute one or more core network functions 288; a UPF 286; an operations support system (OSS) 290 that supports network management systems, service delivery, service fulfillment, service assurance, and customer care; an internet protocol multimedia subsystem (IMS) 291; a business support system (BSS) 292 that supports product management, customer management, revenue management, and/or order management; one or more portal applications 293, and/or other components.

In this example, the communication network 100 employs a cellular architecture to reduce the blast radius of individual components. At the top level, the control plane is in multiple control plane cells 257 to prevent an individual control plane failure from impacting all deployments.

Within each control plane cell 257, multiple redundant stacks can be provided with the control plane shifting traffic to secondary stacks as needed. For example, a cell site 272 may be configured to utilize a nearby local zone 276 as its default core network. In the event that the local zone 276 experiences an outage, the control plane can redirect the cell site 272 to use the backup stack in the regional zone 278. Traffic that would normally be routed from the internet to the local zone 276 can be shifted to endpoints for the regional zones 278. Each control plane cell 257 can implement a "stateless" architecture that shares a common session database across multiple sites (such as across availability zones or edge sites).

Figure 3:
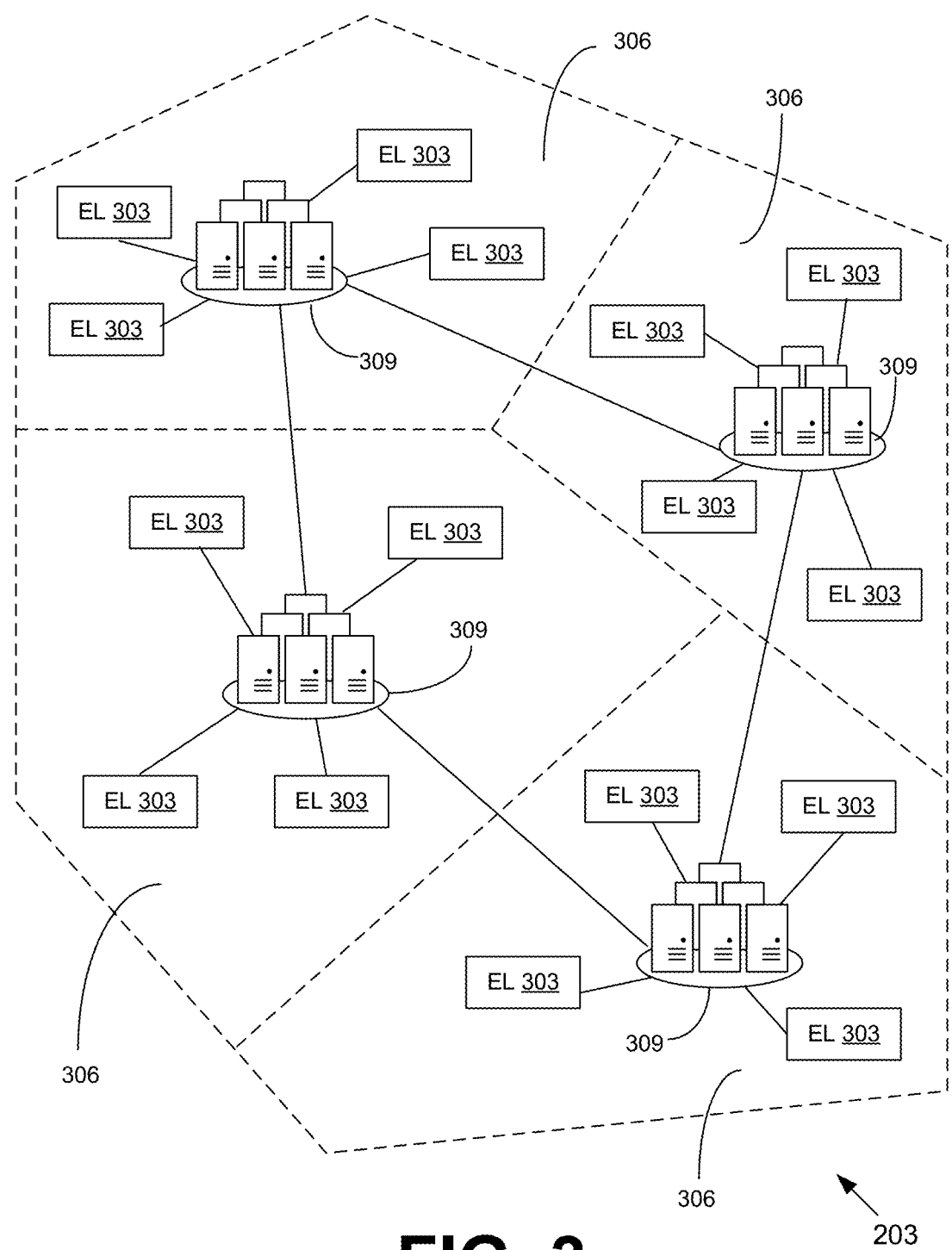
FIG. 3 illustrates an example of the networked environment of FIG. 2A including geographically dispersed provider substrate extensions according to some embodiments of the present disclosure.

FIG. 3 illustrates an exemplary cloud provider network 203 including geographically dispersed provider substrate extensions 224 (FIG. 2A) (or "edge locations 303") according to some embodiments. As illustrated, a cloud provider network 203 can be formed as a number of regions 306, where a region 306 is a separate geographical area in which the cloud provider has one or more data centers 309. Each region 306 can include two or more availability zones (AZs) connected to one another via a private high-speed network such as, for example, a fiber communication connection. An availability zone refers to an isolated failure domain including one or more data center facilities with separate power, separate networking, and separate cooling relative to other availability zones. A cloud provider may strive to position availability zones within a region 306 far enough away from one another such that a natural disaster, widespread power outage, or other unexpected event does not take more than one availability zone offline at the same time. Customers can connect to resources within availability zones of the cloud provider network 203 via a publicly accessible network (e.g., the Internet, a cellular communication network, a communication service provider network). Transit Centers (TC) are the primary backbone locations linking customers to the cloud provider network 203 and may be co-located at other network provider facilities (e.g., Internet service providers, telecommunications providers). Each region 306 can operate two or more TCs for redundancy. Regions 306 are connected to a global network which includes a private networking infrastructure (e.g., fiber connections controlled by the cloud service provider) connecting each region 306 to at least one other region. The cloud provider network 203 may deliver content from points of presence (PoPs) outside of, but networked with, these regions 306 by way of edge locations 303 and regional edge cache servers. This compartmentalization and geographic distribution of computing hardware enables the cloud provider network 203 to provide low-latency resource access to customers on a global scale with a high degree of fault tolerance and stability.

In comparison to the number of regional data centers or availability zones, the number of edge locations 303 can be much higher. Such widespread deployment of edge locations 303 can provide low-latency connectivity to the cloud for a much larger group of end user devices (in comparison to those that happen to be very close to a regional data center). In some embodiments, each edge location 303 can be peered to some portion of the cloud provider network 203 (e.g., a parent availability zone or regional data center). Such peering allows the various components operating in the cloud provider network 203 to manage the compute resources of the edge location 303. In some cases, multiple edge locations 303 may be sited or installed in the same facility (e.g., separate racks of computer systems) and managed by different zones or data centers 309 to provide additional redundancy. Note that although edge locations 303 are typically depicted herein as within a communication service provider network or a radio-based network 103 (FIG. 1A), in some cases, such as when a cloud provider network facility is relatively close to a communications service provider facility, the edge location 303 can remain within the physical premises of the cloud provider network 203 while being connected to the communications service provider network via a fiber or another network link.

An edge location 303 can be structured in several ways. In some implementations, an edge location 303 can be an extension of the cloud provider network substrate including a limited quantity of capacity provided outside of an availability zone (e.g., in a small data center 309 or other facility of the cloud provider that is located close to a customer workload and that may be distant from any availability zones). Such edge locations 303 may be referred to as local zones (due to being more local or proximate to a group of users than traditional availability zones). A local zone may be connected in various ways to a publicly accessible network such as the Internet, for example directly, via another network, or via a private connection to a region 306. Although typically a local zone would have more limited capacity than a region 306, in some cases a local zone may have substantial capacity, for example thousands of racks or more. Some local zones may use similar infrastructure as typical cloud provider data centers, instead of the edge location 303 infrastructure described herein. As discussed, a UV 111 (FIG. 1A) and/or a radio unit 163 (FIG. 1C) delivered by a UV 111 may correspond to an edge location 303.

As indicated herein, a cloud provider network 203 can be formed as a number of regions 306, where each region 306 represents a geographical area in which the cloud provider clusters data centers 309. Each region 306 can further include multiple (e.g., two or more) availability zones (AZs) connected to one another via a private high-speed network, for example, a fiber communication connection. An AZ may provide an isolated failure domain including one or more data center facilities with separate power, separate networking, and separate cooling from those in another AZ. Preferably, AZs within a region 306 are positioned far enough away from one another such that a same natural disaster (or other failure-inducing event) should not affect or take more than one AZ offline at the same time. Customers can connect to an AZ of the cloud provider network 203 via a publicly accessible network (e.g., the Internet, a cellular communication network).

The parenting of a given edge location 303 to an AZ or region 306 of the cloud provider network 203 can be based on a number of factors. One such parenting factor is data sovereignty. For example, to keep data originating from a communication network in one country within that country, the edge locations 303 deployed within that communication network can be parented to AZs or regions 306 within that country. Another factor is availability of services. For example, some edge locations 303 may have different hardware configurations such as the presence or absence of components, such as local non-volatile storage for customer data (e.g., solid state drives), graphics accelerators, etc. Some AZs or regions 306 might lack the services to exploit those additional resources, thus, an edge location could be parented to an AZ or region 306 that supports the use of those resources. Another factor is the latency between the AZ or region 306 and the edge location 303. While the deployment of edge locations 303 within a communication network has latency benefits, those benefits might be negated by parenting an edge location 303 to a distant AZ or region 306 that introduces significant latency for the edge location 303 to region traffic. Accordingly, edge locations 303 are often parented to nearby (in terms of network latency) AZs or regions 306.

Figure 4:
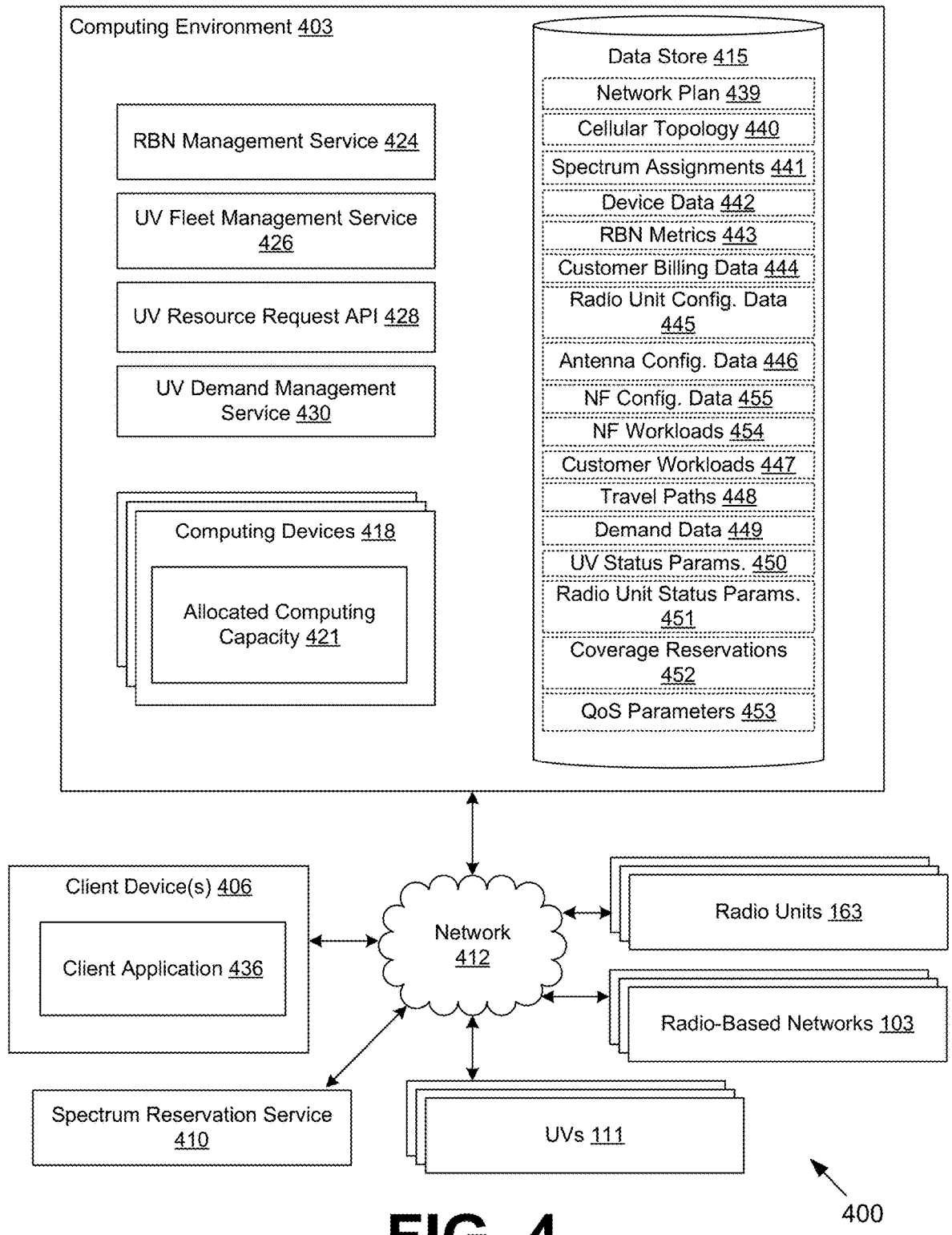
FIG. 4 is a schematic block diagram of the networked environment of FIG. 2A according to various embodiments of the present disclosure.

With reference to FIG. 4, shown is a networked environment 400 according to various embodiments. The networked environment 400 includes a computing environment 403, one or more client devices 406, one or more radio units 163, one or more UVs 111, a spectrum reservation service 410, and one or more radio-based networks 103, which are in data communication with each other via a network 412. The network 412 includes, for example, the Internet, intranets, extranets, wide area networks (WANs), local area networks (LANs), wired networks, wireless networks, cable networks, satellite networks, mesh networks, or other suitable networks, etc., or any combination of two or more such networks.

The computing environment 403 may comprise, for example, a server computer or any other system providing computing capacity. Alternatively, the computing environment 403 may employ a plurality of computing devices that may be arranged, for example, in one or more server banks or computer banks or other arrangements. Such computing devices may be located in a single installation or may be distributed among many different geographical locations. For example, the computing environment 403 may include a plurality of computing devices that together may comprise a hosted computing resource, a grid computing resource, and/or any other distributed computing arrangement. In some cases, the computing environment 403 may correspond to an elastic computing resource where the allotted capacity of processing, network, storage, or other computing-related resources may vary over time. For example, the computing environment 403 may correspond to a cloud provider network 203, where customers are billed according to their computing resource usage based on a utility computing model.

In some embodiments, the computing environment 403 may correspond to a virtualized private network within a physical network comprising virtual machine instances executed on physical computing hardware, e.g., by way of a hypervisor. The virtual machine instances and any containers running on these instances may be given network connectivity by way of virtualized network components enabled by physical network components, such as routers and switches.

Various applications and/or other functionality may be executed in the computing environment 403 according to various embodiments. Also, various data is stored in a data store 415 that is accessible to the computing environment 403. The data store 415 may be representative of a plurality of data stores 415 as can be appreciated. The data stored in the data store 415, for example, is associated with the operation of the various applications and/or functional entities described below.

The computing environment 403 as part of a cloud provider network offering utility computing services includes computing devices 418 and other types of computing devices. The computing devices 418 may correspond to different types of computing devices 418 and may have different computing architectures. The computing architectures may differ by utilizing processors having different architectures, such as x86, x86_64, ARM, Scalable Processor Architecture (SPARC), PowerPC, and so on. For example, some computing devices 418 may have x86 processors, while other computing devices 418 may have ARM processors. The computing devices 418 may differ also in hardware resources available, such as local storage, graphics processing units (GPUs), machine learning extensions, and other characteristics.

The computing devices 418 may have various forms of allocated computing capacity 421, which may include virtual machine (VM) instances, containers, serverless functions, and so forth. The VM instances may be instantiated from a VM image. To this end, customers may specify that a virtual machine instance should be launched in a particular type of computing device 418 as opposed to other types of computing devices 418. In various examples, one VM instance may be executed singularly on a particular computing device 418, or a plurality of VM instances may be executed on a particular computing device 418. Also, a particular computing device 418 may execute different types of VM instances, which may offer different quantities of resources available via the computing device 418. For example, some types of VM instances may offer more memory and processing capability than other types of VM instances.

The components executed on the computing environment 403, for example, include a radio-based network (RBN) management service 424, a UV fleet management service 426, a UV resource request application programming interface (API) 428, a UV demand management service 430, and other applications, services, processes, systems, engines, or functionality not discussed in detail herein.

The RBN management service 424 is executed to provision, manage, configure, and monitor radio-based networks 103 (FIG. 1A) that are operated by a cloud service provider on behalf of customers. To this end, the RBN management service 424 may generate a number of user interfaces that allow customers to place orders for new radio-based networks 103, scale up or scale down existing radio-based networks 103, request radio units 163 delivered by UVs 111, modify the operation of existing radio-based networks 103, configure wireless devices 106 (FIG. 1A) that are permitted to use the radio-based networks 103, provide statistics and metrics regarding the operation of radio-based networks 103, reserve frequency spectrum for customer's networks via a spectrum reservation service 410, provision or release capacity in RANs via the RAN interface 273, and so on. For example, the RBN management service 424 may generate one or more network pages, such as web pages, that include the user interfaces. Also, the RBN management service 424 may support this functionality by way of an API that may be called by a client application 436. In addition to facilitating interaction with users, the RBN management service 424 also implements orchestration of deployments and configuration changes for the radio-based networks 103 and on-going monitoring of performance parameters. In particular, the RBN management service 424 may implement a service for managing dynamic locations of radio units 163 in a radio-based network 103, where the radio units 163 may be moved on demand by a fleet of UVs 111. In some cases, the RBN management service 424 may generate a network plan 439 for a customer based at least in part in a specification of the customer's location, an automated site survey by a UV 111, and/or other input parameters.

The UV fleet management service 426 is executed to manage a fleet of a plurality of UVs 111. To this end, the UV fleet management service 426 may generate schedules and travel paths for UVs 111, allocate UVs 111 to provide edge computing capacity and/or network connectivity, allocate UVs 111 to replace or charge batteries in other UVs 111 or radio units 163, and perform other actions. In various embodiments, operation of the UVs 111 may be partially or fully controlled within the UV 111 or by the UV fleet management service 426 based at least in part on availability of a communication link between the UV fleet management service 426 and the UV 111 as well as the computing resources present on the UV 111.

The UV resource request API 428 is an interface that enables customers to request resources (e.g., network connectivity and/or edge computing capacity) for addition to their existing radio-based networks 103 or to provide a radio-based network 103. The UV resource request API 428 may be invoked by a customer manually manipulating a user interface or automatically by another service (e.g., an RBN management service 424 requesting to fill a coverage gap).

The UV demand management service 430 is executed to manage demand for capacity in the fleet of UVs 111. For example, the UV demand management service 430 may offer unallocated edge computing capacity and/or unallocated network connectivity, potentially along a travel path, so that customers may bid for the capacity. The UV demand management service 430 may determine whether the bid exceeds the corresponding expense to provide the requested resource, and may also manage other parameters that may make providing the resource practical or impractical.

The data stored in the data store 415 includes, for example, one or more network plans 439, one or more cellular topologies 440, one or more spectrum assignments 441, device data 442, one or more RBN metrics 443, customer billing data 444, radio unit configuration data 445, antenna configuration data 446, one or more customer workloads 447, one or more travel paths 448 for UVs 111, demand data 449, one or more UV status parameters 450, one or more radio unit status parameters 451, one or more coverage reservations 452, one or more quality-of-service (QoS) parameters 453, one or more network function workloads 454, network function configuration data 455, and potentially other data.

The network plan 439 is a specification of a radio-based network 103 to be deployed for a customer. For example, a network plan 439 may include premises locations or geographic areas to be covered, a number of cells, device identification information and permissions, a desired maximum network latency, a desired bandwidth or network throughput for one or more classes of devices, one or more quality of service parameters for applications or services, one or more routes to be covered by the RBN 103, a schedule of coverage for the RBN 103 or for portions of the RBN 103, a periodic schedule of coverage for the RBN 103 or for portions of the RBN 103, a start time for the RBN 103 or for portions of the RBN 103, an end time for the RBN 103 or for portions of the RBN 103, and/or other parameters that can be used to create a radio-based network 103. The network plan 439 may include potential landing locations for UVs 111 and/or potential locations for deploying radio units 163. A customer may manually specify one or more of these parameters via a user interface. One or more of the parameters may be prepopulated as default parameters. In some cases, a network plan 439 may be generated for a customer based at least in part on automated site surveys using UVs 111. Values of the parameters that define the network plan 439 may be used as a basis for a cloud service provider billing the customer under a utility computing model. For example, the customer may be billed a higher amount for lower latency targets and/or higher bandwidth targets in a service-level agreement (SLA), and the customer can be charged on a per-device basis, a per-cell basis, based on a geographic area served, based on spectrum availability, etc. In some cases, the network plan 439 may incorporate thresholds and reference parameters determined at least in part on an automated probe of an existing private network of a customer.

The cellular topology 440 includes an arrangement of a plurality of cells for a customer that takes into account reuse of frequency spectrum where possible given the location of the cells. The cellular topology 440 may be automatically generated given a site survey. In some cases, the number of cells in the cellular topology 440 may be automatically determined based on a desired geographic area to be covered, availability of backhaul connectivity at various sites, signal propagation, available frequency spectrum, and/or on other parameters. For radio-based networks 103, the cellular topology 440 may be developed to cover one or more buildings in an organizational campus, one or more schools in a school district, one or more buildings in a university or university system, and other areas.

The spectrum assignments 441 include frequency spectrum that is available to be allocated for radio-based networks 103 as well as frequency spectrum that is currently allocated to radio-based networks 103. The frequency spectrum may include spectrum that is publicly accessible without restriction, spectrum that is individually owned or leased by customers, spectrum that is owned or leased by the provider, spectrum that is free to use but requires reservation, and so on. The spectrum assignments 441 may indicate which frequencies may be used by UVs 111 and/or radio units 163.

The device data 442 corresponds to data describing wireless devices 106 that are permitted to connect to the radio-based network 103. This device data 442 includes corresponding users, account information, billing information, data plans, permitted applications or uses, an indication of whether the wireless device 106 is mobile or fixed, a location, a current cell, a network address, device identifiers (e.g., International Mobile Equipment Identity (IMEI) number, Equipment Serial Number (ESN), Media Access Control (MAC) address, Subscriber Identity Module (SIM) number, etc.), and so on.

The RBN metrics 443 include various metrics or statistics that indicate the performance or health of the radio-based network 103. Such RBN metrics 443 may include bandwidth metrics, dropped packet metrics, signal strength metrics, latency metrics, and so on. The RBN metrics 443 may be aggregated on a per-device basis, a per-cell basis, a per-customer basis, etc.

The customer billing data 444 specifies charges that the customer is to incur for the operation of the radio-based network 103 for the customer by the provider. The charges may include fixed costs based upon equipment deployed to the customer and/or usage costs based upon utilization as determined by usage metrics that are tracked. In some cases, the customer may purchase the equipment up-front and may be charged only for bandwidth or backend network costs. In other cases, the customer may incur no up-front costs and may be charged purely based on utilization. With the equipment being provided to the customer based on a utility computing model, the cloud service provider may choose an optimal configuration of equipment in order to meet customer target performance metrics while avoiding overprovisioning of unnecessary hardware. In some cases, the customer billing data 444 may bidding information indicating maximum expenses that the customer is willing to incur for use of a UV 111 and/or a radio unit 163 to provide coverage to the radio-based network 103 for the customer.

The radio unit configuration data 445 may correspond to configuration settings for radio units deployed in radio-based networks 103. Such settings may include frequencies to be used, protocols to be used, modulation parameters, bandwidth, network routing and/or backhaul configuration, and so on.

The antenna configuration data 446 may correspond to configuration settings for antennas, to include frequencies to be used, azimuth, vertical or horizontal orientation, beam tilt, and/or other parameters that may be controlled automatically (e.g., by network-connected motors and controls on the antennas) or manually by directing a user to mount the antenna in a certain way or make a physical change to the antenna. The antenna configuration data 446 may configure antennas used by the UV 111 and/or the radio unit 163.

The network function configuration data 455 corresponds to configuration settings that configure the operation of various network functions for the radio-based network 103. In various embodiments, the network functions may be deployed in VM instances or containers located in computing devices 418 that are at cell sites, on radio units 163, on UVs 111, at customer aggregation sites, or in data centers remotely located from the customer. Non-limiting examples of network functions may include an access and mobility management function, a session management function, a user plane function, a policy control function, an authentication server function, a unified data management function, an application function, a network exposure function, a network function repository, a network slice selection function, and/or others. The network function workloads 454 correspond to machine images, containers, or functions to be launched in the allocated computing capacity 421 to perform one or more of the network functions.

The customer workloads 447 correspond to machine images, containers, or functions of the customer that may be executed alongside or in place of the network function workloads 454 in the allocated computing capacity 421. For example, the customer workloads 447 may provide or support a customer application or service. In various examples, the customer workloads 447 relate to factory automation, autonomous robotics, augmented reality, virtual reality, design, surveillance, and so on.

The travel paths 448 describe the projected routes of one or more UVs 111 in a fleet of UVs 111 that provide edge computing capacity and/or network connectivity. Individual travel paths 448 may indicate a starting location, an ending location, and optionally one or more intermediate locations. In some cases, a travel path 448 may be a straight line between the starting and ending locations, or the travel path 448 may represent diversions to avoid obstacles, interference, or restricted areas, or to serve the intermediate locations. In some cases, the travel paths 448 are created based at least in part upon weather forecasts of wind, rain, etc., that could adversely affect travel of a UV 111. The travel paths 448 may specify time periods to stay at the respective locations and travel velocities. The travel paths 448 may indicate stopping or landing locations or criteria for selecting stopping or landing locations. The travel paths 448 may also indicate the different frequencies or antenna configurations to be used at different locations for providing network connectivity to wireless devices 106 (FIG. 1A) or also to backhaul the communications to other UVs 111 or base stations.

The demand data 449 indicates the respective demands for edge computing capacity and/or network connectivity at various locations at various times. The demand data 449 may include or may be generated from bids from potential customers (e.g., having radio-based networks 103) that desire edge computing capacity and/or network connectivity at various locations at various times. The demand data 449 may influence travel paths 448.

The UV status parameters 450 provide information on one or more status parameters for individual UVs 111. The UV status parameters 450 may indicate current location, current velocity, trajectory, remaining battery charge, current solar cell output, current power demand, observed interference, current network bandwidth, signal strength, storage utilization, processing utilization, and/or other parameters.

The radio unit status parameters 451 provide information on one or more status parameters for individual radio units 163. The radio unit status parameters 451 may indicate current location, remaining battery charge, power supply status, current solar cell output, current power demand, observed interference, current network bandwidth, signal strength, storage utilization, processing utilization, and/or other parameters.

The coverage reservations 452 correspond to one or more reservations for edge computing capacity and/or network connectivity provided by a UV 111 and/or a radio unit 163. The coverage reservations 452 may be associated with a location and a time period. In some cases, edge computing capacity of a UV 111 and/or a radio unit 163 may be reserved in an area, but irrespective of a particular geographic location. In some cases, a UV 111 and/or a radio unit 163 may accommodate multiple coverage reservations 452 concurrently.

The QoS parameters 453 indicate QoS parameters for customer applications, customer devices, and/or radio-based networks 103. The QoS parameters 453 may indicate maximum latency, minimum bandwidth, maximum number of network hops, minimum processing requirements, minimum storage requirements, and/or other requirements. The radio-based networks 103 may implement one or more network slices that guarantee one or more QoS requirements.

The client device 406 is representative of a plurality of client devices 406 that may be coupled to the network 412. The client device 406 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 406 may include a display comprising, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 406 may be configured to execute various applications such as a client application 436 and/or other applications. The client application 436 may be executed in a client device 406, for example, to access network content served up by the computing environment 403 and/or other servers, thereby rendering a user interface on the display. To this end, the client application 436 may comprise, for example, a browser, a dedicated application, etc., and the user interface may comprise a network page, an application screen, etc. The client device 406 may be configured to execute applications beyond the client application 436 such as, for example, email applications, social networking applications, word processors, spreadsheets, and/or other applications.

In some embodiments, the spectrum reservation service 410 provides reservations of frequency spectrum for customers' use in radio-based networks 103 as well as for UVs 111 to communicate. In one scenario, the spectrum reservation service 410 is operated by an entity, such as a third party, to manage reservations and coexistence in publicly accessible spectrum. One example of such spectrum may be the Citizens Broadband Radio Service (CBRS). In another scenario, the spectrum reservation service 410 is operated by a telecommunications service provider in order to sell or sublicense portions of spectrum owned or licensed by the provider.

Figure 5A:
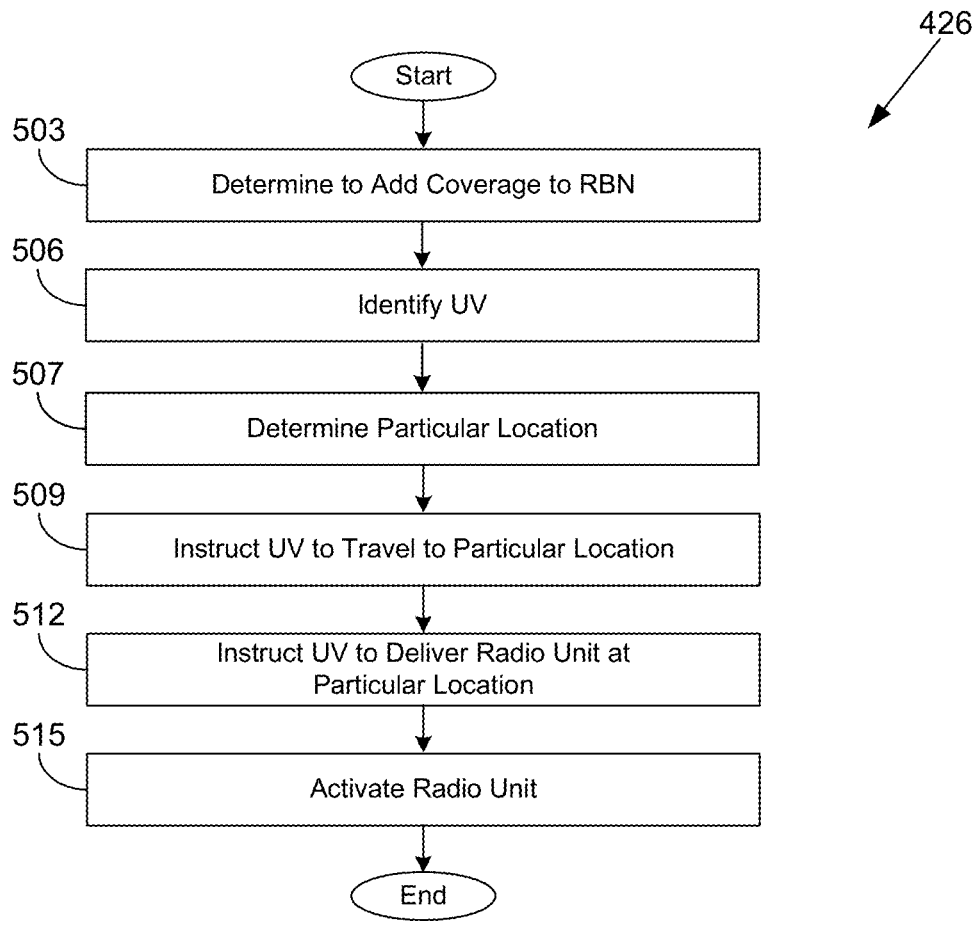
FIGS. 5A-7 are flowcharts illustrating examples of functionality implemented as portions of an unmanned vehicle fleet management service executed in a computing environment in the networked environment of FIG. 4 according to various embodiments of the present disclosure.

Referring next to FIG. 5A, shown is a flowchart that provides one example of the operation of a portion of the UV fleet management service 426 according to various embodiments. It is understood that the flowchart of FIG. 5A provides merely an example of the many different types of functional arrangements that may be employed to implement the operation of the portion of the UV fleet management service 426 as described herein. As an alternative, the flowchart of FIG. 5A may be viewed as depicting an example of elements of a method implemented in the computing environment 403 (FIG. 4) according to one or more embodiments.

Beginning with box 503, the UV fleet management service 426 determines to add coverage to an RBN 103 (FIG. 1A). In some cases, the RBN 103 may include a plurality of radio units 163 (FIG. 1C) previously placed by UVs 111 (FIG. 1A). For example, a customer may manually request additional coverage via the UV resource request API 428 (FIG. 4), or the RBN management service 424 (FIG. 4) may automatically determine that there is a coverage gap in an area for the RBN 103 such that additional coverage is necessary and then make a request via the UV resource request API 428. In some cases, the RBN management service 424 may automatically monitor various RBN metrics 443 (FIG. 4), and determine that additional coverage is needed in an area based upon failure to of the RBN metric 443 to meet one or more QoS parameters 453 (FIG. 4). The additional coverage may pertain to a specific area and may last for a time period, thereby enabling the RBN 103 to meet the QoS parameters 453. In one example, the time period is sufficient to outlast a temporary or ephemeral demand for the coverage. In another example, the time period is sufficient for a permanent radio unit 163 to be deployed for the RBN 103.

In box 506, the UV fleet management service 426 identifies a particular UV 111 from the fleet of UVs 111 based at least in part on a proximity of the UV 111 to the area where coverage is needed. The UV fleet management service 426 may also consider other factors from the UV status parameters 450 (FIG. 4) or the radio unit status parameters 451 (FIG. 4) to ensure that the UV 111 has sufficient fuel, that it is carrying an appropriate radio unit 163 as a payload, that the radio unit 163 has a sufficient battery power, that the radio unit 163 is capable of communicating on a frequency required by the RBN 103, that the UV 111 is not already scheduled and committed to provide a resource, and/or other factors. Thus, in some cases, the UV fleet management service 426 may deploy the nearest UV 111 to the area, but in other cases, other reasons may prompt the UV fleet management service 426 to deploy another UV 111 that is not the nearest to the area. In some cases, the UV fleet management service 426 identifies a set of a plurality of UVs 111 to work in concert in order to provide the needed coverage. For a given UV 111 carrying a radio unit 163, the UV fleet management service 426 may determine whether to have the UV 111 drop the radio unit 163 off on the ground, stay in place, or move to a different location using calculations based at least in part on remaining fuel for the UV 111, interference at the location, current geographical regulations, altitude, power output, and user demand and connectivity requirements.

In box 507, the UV fleet management service 426 determines a particular location to deploy the UV 111 and the radio unit 163. In one scenario, the particular location may be a reference location at the center of a coverage area to be provided. In another scenario, the UV fleet management service 426 may determine a suitable landing location that is proximate to the desired coverage area. For example, the UV fleet management service 426 may identify a rooftop, a docking station, and/or other location that is suitably equipped or for which the UV fleet management service 426 has permission to land and deploy a radio unit 163.

In some cases, the chosen location may necessitate the use of a directional antenna by the radio unit 163 in order to target the geographic area that needs coverage, and the radio unit 163 may be equipped to adjust its antenna accordingly. Different UVs 111 may be equipped with different types of antennas that may be adjustable, and some UVs 111 may be equipped with multiple types of antennas. The antennas may vary based on frequency, directionality, and polarization. The particular location may also be selected based on the ability to forward or otherwise backhaul communications for the RBN 103. This may entail forwarding communications to other radio units 163, to other UVs 111, or to other base station infrastructure of the RBN 103. In some cases, the particular location is selected based on the remaining fuel of the UV 111 in order to ensure that the UV 111 has sufficient fuel to reach the location and/or to travel to a subsequent location.

In box 509, the UV fleet management service 426 instructs the UV 111 to travel to the particular location. For example, the UV fleet management service 426 may send a message through a control communication channel to the UV 111. In one embodiment, the control communication channel utilizes a mesh network of the UVs 111 and potentially the radio units 163 to communicate. In another embodiment, a point-to-point link from a control center to the UV 111 is used.

In box 512, the UV fleet management service 426 instructs the UV 111 to deliver a particular radio unit 163 at the particular location. In this regard, the UV fleet management service 426 may instruct the UV 111 to pick up the radio unit 163 from some location, or the UV 111 may already be carrying the UV 111 as a payload. The UV 111 may also be instructed to change a battery or another hardware component of the radio unit 163, and/or apply a charge to the battery of the radio unit 163. The radio unit 163 may include computing capacity that may function as a provider substrate extension 224 (FIG. 2A) of a cloud provider network 203 (FIG. 2A) in order to execute network function workloads 454 (FIG. 4) and/or customer workloads 447 (FIG. 4).

In delivering the radio unit 163, the UV 111 may be configured to land the radio unit 163 at the location, which may entail autonomously determining and verifying a suitable exact location for deployment. The UV 111 may determine whether it is safe to land at the location. Where a docking station is provided, the UV 111 may assist in orienting the radio unit 163 and in connecting power supplies (i.e., a power transfer port) or networking connections from the docking station to the radio unit 163. The UV may also pause at the docking station to recharge if a power supply is provided.

In box 515, the UV fleet management service 426 causes the radio unit 163 to be activated. For example, the radio unit 163 may be configured to use the appropriate frequencies and/or antennas for communication. The RBN management service 424 may then activate the radio unit 163 for use on the RBN 103, including configuring core network resources to support the usage of the radio unit 163. In some embodiments, one or more network functions may be executed within the radio unit 163 in order to support the core network of the RBN. In various scenarios, the radio unit 163 may persist in the RBN 103 indefinitely or for a particular time period, where the time period may be subject to renewal. Thereafter, the operation of the portion of the UV fleet management service 426 ends.

Figure 5B:
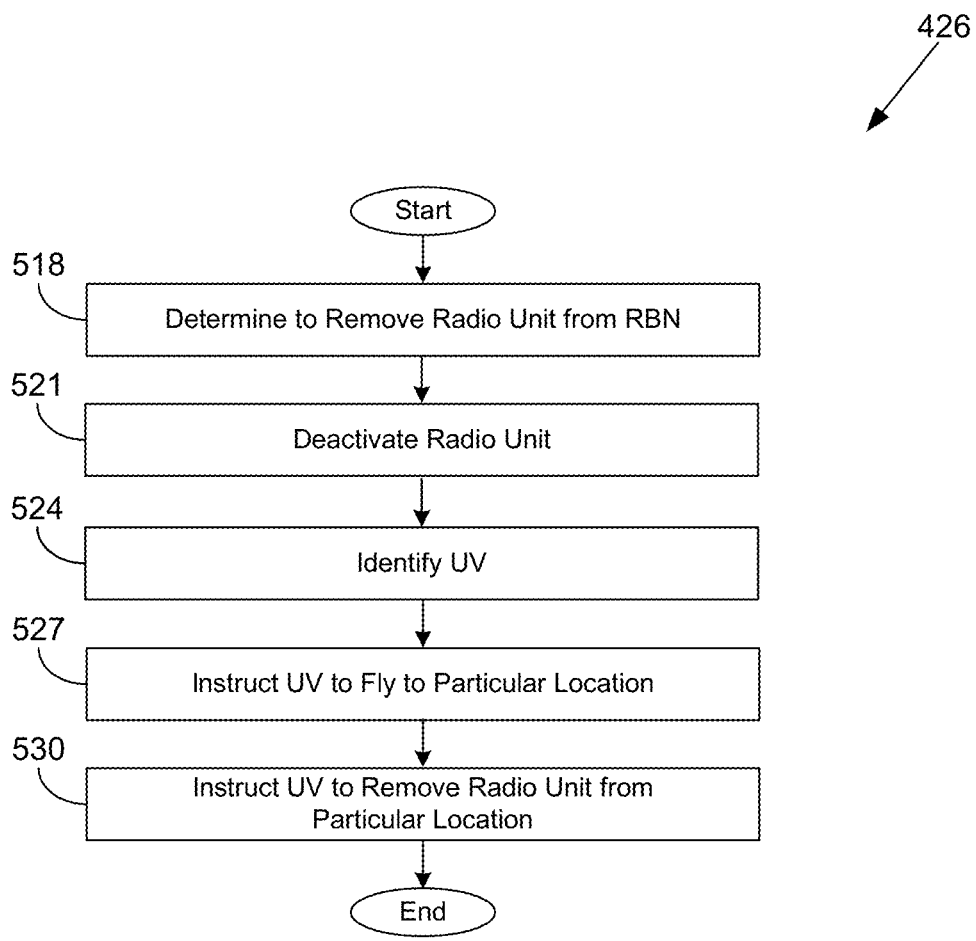

Moving on to FIG. 5B, shown is a flowchart that provides one example of the operation of another portion of the UV fleet management service 426 according to various embodiments. It is understood that the flowchart of FIG. 5B provides merely an example of the many different types of functional arrangements that may be employed to implement the operation of the portion of the UV fleet management service 426 as described herein. As an alternative, the flowchart of FIG. 5B may be viewed as depicting an example of elements of a method implemented in the computing environment 403 (FIG. 4) according to one or more embodiments.

Beginning with box 518, the UV fleet management service 426 determines to remove a radio unit 163 (FIG. 1C) from an RBN 103 (FIG. 1A). For example, the allocated time period for the radio unit 163 may have expired, or a customer may request via the UV resource request API 428 (FIG. 4) that the radio unit 163 be removed. In some cases, a replacement radio unit 163 may have already been delivered. In other cases, the demand associated with the coverage provided by the radio unit 163 may have diminished.

In box 521, the UV fleet management service 426 deactivates the radio unit 163, and the RBN management service 424 may reconfigure the RBN 103 to remove the radio unit 163 from the RBN 103. This may involve transferring network function workloads 454 (FIG. 4) previously performed by the radio unit 163 to another computing resource, and also updating the core network for the RBN 103 to remove the cell site 109 (FIG. 1A) provided by the radio unit 163.

In box 524, the UV fleet management service 426 identifies a UV 111 (FIG. 1A) from a fleet including a plurality of UVs 111. The UV 111 may be at a home base, or may be traveling to a different location or performing a different task. The UV 111 may be selected based at least in part on a proximity of the UV 111 to the location of the radio unit 163. Other factors may also be involved, such as UV status parameters 450 (FIG. 4) indicating whether the UV 111 has sufficient fuel to reach the location and a subsequent destination, whether the UV 111 is physically capable of lifting the radio unit 163, and other factors.

In box 527, the UV fleet management service 426 instructs the UV 111 to travel to the particular location. For example, the UV fleet management service 426 may send a message through a control communication channel to the UV 111. In one embodiment, the control communication channel utilizes a mesh network of the UVs 111 and potentially the radio units 163 to communicate. In another embodiment, a point-to-point link from a control center to the UV 111 is used.

In box 530, the UV fleet management service 426 instructs the UV 111 to remove the radio unit 163 from the particular location. This may involve docking at a docking station and causing the radio unit 163 to be disconnected from any power transfer port or network port associated with the docking station. The UV 111 may also pause to recharge if a power supply port is available. Subsequently, with the radio unit 163 as a payload, the UV 111 may return to a home base or deploy the radio unit 163 in a different location. Thereafter, the operation of the portion of the UV fleet management service 426 ends.

Figure 5C:
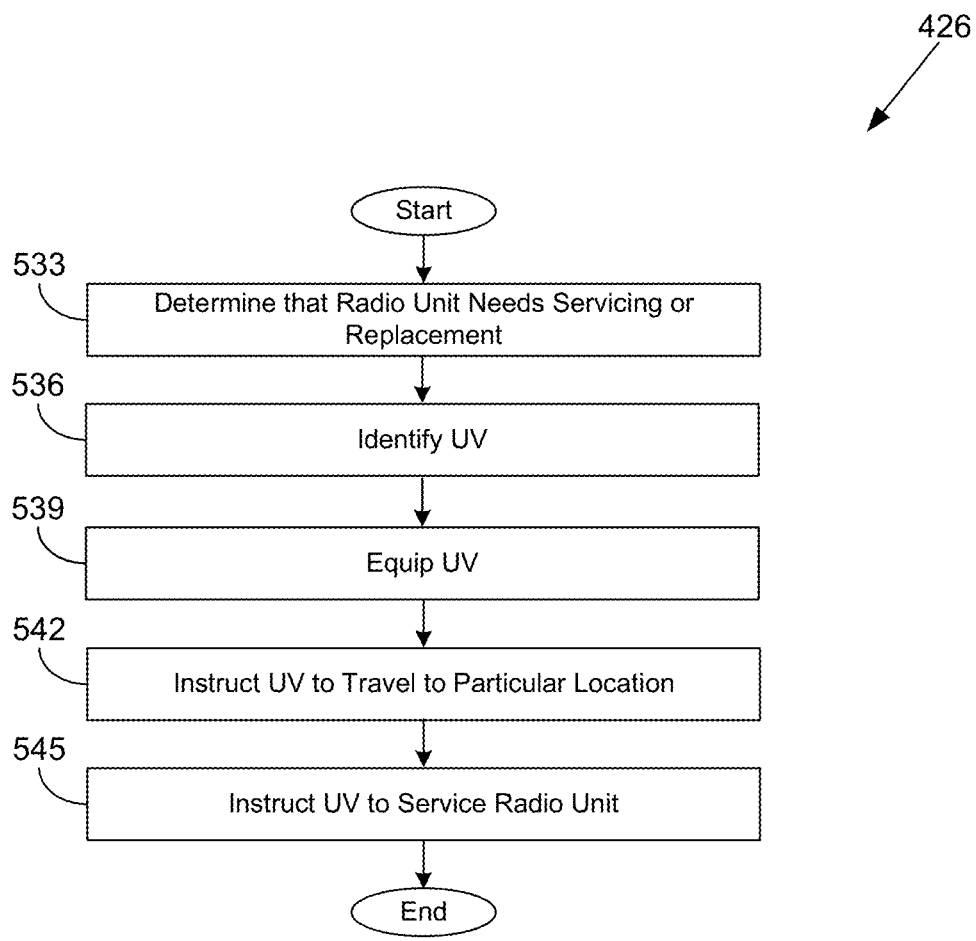

Continuing to FIG. 5C, shown is a flowchart that provides one example of the operation of another portion of the UV fleet management service 426 according to various embodiments. It is understood that the flowchart of FIG. 5C provides merely an example of the many different types of functional arrangements that may be employed to implement the operation of the portion of the UV fleet management service 426 as described herein. As an alternative, the flowchart of FIG. 5C may be viewed as depicting an example of elements of a method implemented in the computing environment 403 (FIG. 4) according to one or more embodiments.

Beginning with box 533, the UV fleet management service 426 determines that a radio unit 163 (FIG. 1C) deployed for an RBN 103 (FIG. 1A) needs servicing or replacement. For example, in monitoring the radio unit status parameters 451 (FIG. 4), the UV fleet management service 426 may determine that the radio unit 163 is running low on battery (i.e., having a charge level of the battery below a threshold), has filled up a storage capacity, has stored data for UV-based data transfer, has a hardware failure, or needs some other type of service or replacement. In another example, the UV fleet management service 426 may determine that a demand for edge computing capacity or network connectivity may require that the radio unit 163 of a first type be replaced with a different radio unit 163 of a second type. The different radio unit 163 may have more data storage, more computing resources, etc., if the demand for such has increased, or the different radio unit 163 may have less data storage, less computing resources, etc., if the demand for such has decreased.

In box 536, the UV fleet management service 426 identifies a particular UV 111 in order to perform the servicing or replacement. In this regard, the UV fleet management service 426 may seek a UV 111 based on proximity of the UV 111 to the location of the radio unit 163 or proximity of the UV 111 to a replacement hardware component or replacement battery. The UV 111 may be carrying a replacement battery or other hardware component at present. In some cases, the UV 111 may be selected from UVs 111 located at a home base, or in other cases, the UV 111 may be on assignment or traveling along a route. If the UV 111 is selected to recharge the battery of the radio unit 163, the UV 111 may be selected such that it has a sufficient charge remaining in order to reach the radio unit 163, to apply a sufficient charge to recharge the radio unit 163, and to make it to a next destination with a power supply. In some cases, the UV fleet management service 426 identifies a set of a plurality of UVs 111 to work in concert in order to provide the servicing or replacement. For example, a single radio unit 163 may be replaced with multiple radio units 163 deployed at different locations by a plurality of UVs 111. As another example, a plurality of UVs 111 may each carry a respective component to service a radio unit 163.

In box 539, the UV fleet management service 426 causes the UV 111 to become equipped if necessary to service the radio unit 163. This can include picking up a different radio unit 163, picking up a hardware component or replacement battery, or performing other functions. In some cases, the UV 111 may be manually loaded with the replacement equipment at a home base.

In box 542, the UV fleet management service 426 instructs the UV 111 to travel to the particular location. For example, the UV fleet management service 426 may send a message through a control communication channel to the UV 111. In one embodiment, the control communication channel utilizes a mesh network of the UVs 111 and potentially the radio units 163 to communicate. In another embodiment, a point-to-point link from a control center to the UV 111 is used.

In box 545, the UV fleet management service 426 instructs the UV 111 to service the radio unit 163 to replace the radio unit 163. For example, the UV 111 may connect to the radio unit 163 to recharge the battery in the radio unit 163, or the UV 111 may physically exchange a battery in the radio unit 163. In another example, the UV 111 may physically retrieve a data storage medium or another hardware component and may replace the component with a different component. In some cases, the UV 111 may deliver a replacement radio unit 163 and retrieve the other radio unit 163 as a payload. Subsequently, with the retrieved radio unit 163 and/or hardware component as payload, the UV 111 may return to a home base or deploy the radio unit 163 or hardware component in a different location. Thereafter, the operation of the portion of the UV fleet management service 426 ends.

Figure 6:
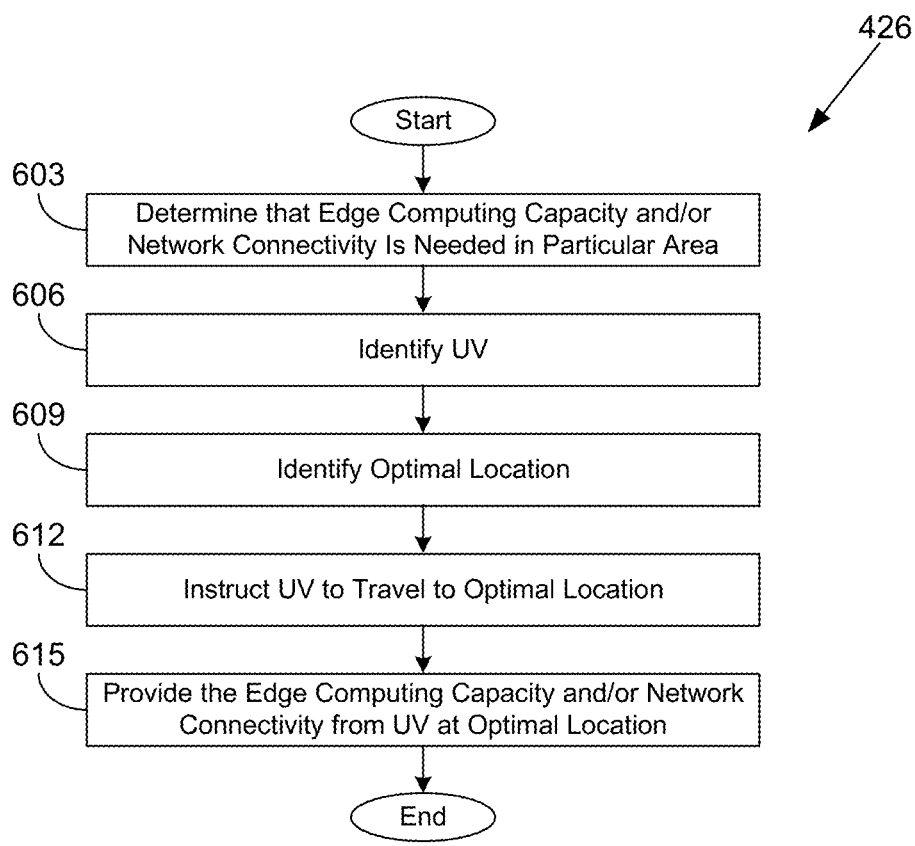

Moving on to FIG. 6, shown is a flowchart that provides one example of the operation of another portion of the UV fleet management service 426 according to various embodiments. It is understood that the flowchart of FIG. 6 provides merely an example of the many different types of functional arrangements that may be employed to implement the operation of the portion of the UV fleet management service 426 as described herein. As an alternative, the flowchart of FIG. 6 may be viewed as depicting an example of elements of a method implemented in the computing environment 403 (FIG. 4) according to one or more embodiments.

Beginning with box 603, the UV fleet management service 426 may determine that edge computing capacity and/or network connectivity is needed in a particular area. For example, the RBN management service 424 (FIG. 4) may monitor the RBN metrics 443 (FIG. 4) and determine that a QoS parameter 453 (FIG. 4) is not being met in an area. It may be that the use of other computing capacity available to the RBN 103 would not meet the QoS parameter 453 associated with a workload. In another example, a user may submit a request via the UV resource request API 428 (FIG. 4) to add coverage in a particular area.

In box 606, the UV fleet management service 426 identifies a particular UV 111 (FIG. 1A) from the fleet of UVs 111 based at least in part on a proximity of the UV 111 to the area where coverage is needed. The UV fleet management service 426 may also consider other factors from the UV status parameters 450 (FIG. 4) or to ensure that the UV 111 has sufficient fuel, that it is equipped with an appropriate radio unit 163 (FIG. 1C) as a payload, that the UV 111 has a certain computing capability, that the radio unit 163 has a sufficient battery, that the radio unit 163 is capable of communicating on a frequency required by the RBN 103, that the UV 111 is not already scheduled and committed to provide a resource, and/or other factors. Thus, in some cases, the UV fleet management service 426 may deploy the nearest UV 111 to the area, but in other cases, other reasons may prompt the UV fleet management service 426 to deploy another UV 111 that is not the nearest to the area.

In box 609, the UV fleet management service 426 determines an optimal location to deploy the UV 111 in order to provide the edge computing capacity and/or the network connectivity. The optimal location may be determined using a linear optimization based at least in part on an analysis of one or more parameters, e.g., ability to cover the coverage area, fuel remaining in the UV 111, power needed to produce a signal, height, terrain, interference, and so on. In one scenario, the optimal location may be a reference location at the center of a coverage area to be provided. In another scenario, the UV fleet management service 426 may determine a suitable landing location that is proximate to the desired coverage area. For example, the UV fleet management service 426 may identify a rooftop, a docking station, and/or another location that is suitably equipped, or for which the UV fleet management service 426 has permission to land or stay.

In some cases, the chosen location may necessitate the use of a directional antenna in order to target the geographic area that needs coverage, and the UV 111 may be equipped to adjust its antenna accordingly. The optimal location may also be selected based on the ability to forward or otherwise backhaul communications for the RBN 103. This may entail forwarding communications to other radio units 163, to other UVs 111, or to other base station infrastructure of the RBN 103. In some cases, the optimal location is selected in order to ensure that the UV 111 has sufficient fuel to reach the location and/or to travel to a subsequent location.

In box 612, the UV fleet management service 426 instructs the UV 111 to travel to the particular location. For example, the UV fleet management service 426 may send a message through a control communication channel to the UV 111. In one embodiment, the control communication channel utilizes a mesh network of the UVs 111 and potentially the radio units 163 to communicate. In another embodiment, a point-to-point link from a control center to the UV 111 is used. In some cases, the UV 111 may provide network connectivity to a different RBN 103 while traveling to the location. In other cases, the UV 111 may be able to provide edge computing capacity to the RBN 103 while traveling at or near the location.

In box 615, the UV fleet management service 426 provisions the UV 111 to provide the edge computing capacity and/or the network connectivity from the optimal location. In some cases, this may involve landing or stopping and then providing the edge computing capacity and/or the network connectivity. In other cases, the UV 111 may remain in-flight or hover around the particular location to provide the resources. The UV 111 may provide the resources for a time period. In some examples, an RBN 103 may transfer a network function workload 454 (FIG. 4) to the UV 111 in order to meet QoS requirements. In other examples, customer workloads 447 (FIG. 4) may be executed in the UV 111 in order to comply with data sovereignty or location requirements. In some cases, the UV 111 may be instructed to transfer data to or from a data storage device at the location, in order to provide physical data transfer of loads potentially in the terabyte or petabyte range. Thereafter, the operation of the portion of the UV fleet management service 426 ends.

Figure 7:
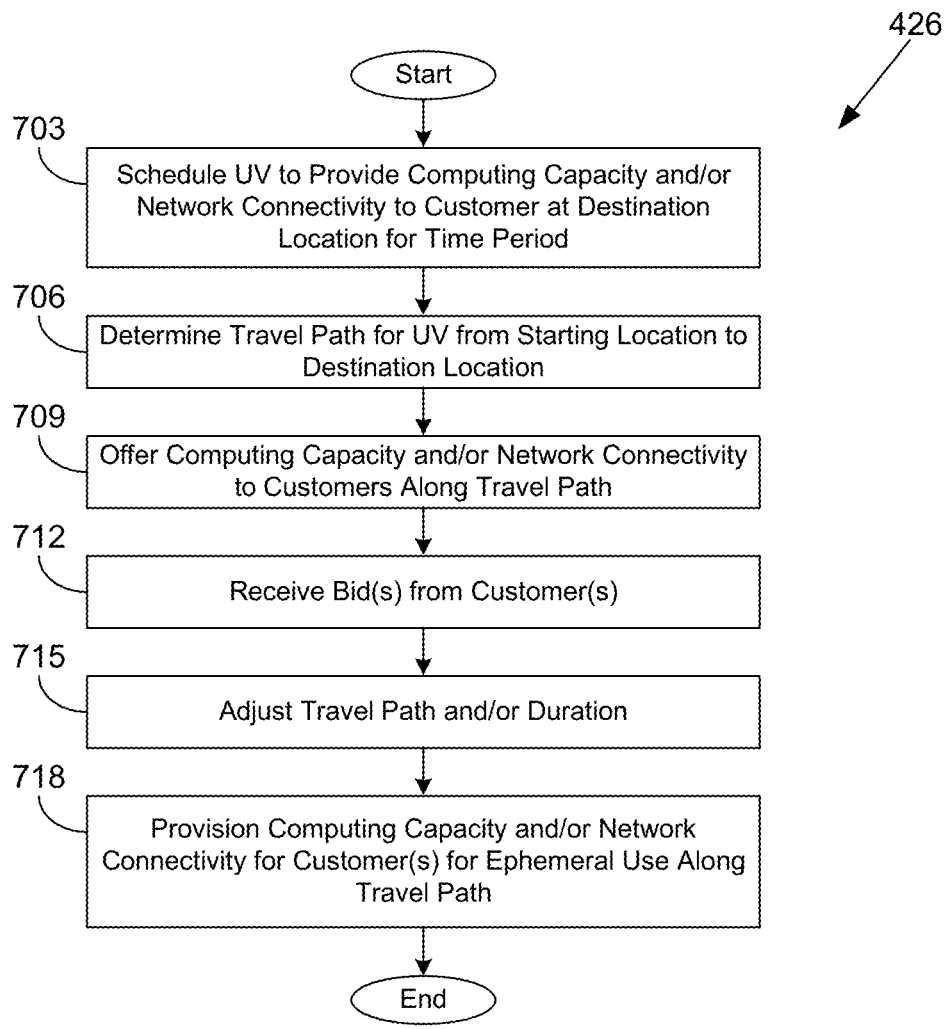

Continuing to FIG. 7, shown is a flowchart that provides one example of the operation of another portion of the UV fleet management service 426 according to various embodiments. It is understood that the flowchart of FIG. 7 provides merely an example of the many different types of functional arrangements that may be employed to implement the operation of the other portion of the UV fleet management service 426 as described herein. As an alternative, the flowchart of FIG. 7 may be viewed as depicting an example of elements of a method implemented in the computing environment 403 (FIG. 4) according to one or more embodiments.

Beginning with box 703, the UV fleet management service 426 schedules a UV 111 to provide computing capacity and/or network connectivity to a customer, such as an RBN 103 (FIG. 1A) at a destination location for a time period, thus creating a coverage reservation 452 (FIG. 4). The customer may enter a bid for the computing capacity and/or network connectivity requirements for a time period. The bid may meet minimum requirements associated with expense and may be accepted as a maximum bid.

In box 706, the UV fleet management service 426 determines a travel path 448 (FIG. 4) for a UV 111 from a starting location to the destination location in the coverage reservation 452. The travel path 448 may be a straight line or may avoid obstacles or restricted areas. The UV fleet management service 426 identifies a particular UV 111 (FIG. 1A) from the fleet of UVs 111 based at least in part on a proximity of the UV 111 to the area where coverage is needed. The UV fleet management service 426 may also consider other factors from the UV status parameters 450 (FIG. 4) or to ensure that the UV 111 has sufficient fuel, that it is equipped with an appropriate radio unit 163 (FIG. 1C) as a payload, that the radio unit 163 has a sufficient battery, that the radio unit 163 is capable of communicating on a frequency required by the RBN 103, that the UV 111 is not already scheduled and committed to provide a resource, and/or other factors. Thus, in some cases, the UV fleet management service 426 may deploy the nearest UV 111 to the area, but in other cases, other reasons may prompt the UV fleet management service 426 to deploy another UV 111 that is not the nearest to the area.

In box 709, the UV fleet management service 426 offers unallocated computing capacity and/or network connectivity to one or more potential customers identified as being along the travel path 448 or within an acceptable deviation of the travel path 448. The customers may correspond to different RBNs 103 or different users having wireless devices 106 (FIG. 1A). In some cases, the UV fleet management service 426 may identify an RBN 103 as having a coverage gap along the travel path 448, which may be determined observationally by signal strength measurements by UVs 111 or by other approaches. In some cases, the customers may search a database to determine whether unallocated computing capacity and/or network connectivity is potentially available at a given place or time at different potential bids that could be accepted. Lower bids below a first threshold may result only in providing the resource along an established travel path 448, while a bid underneath a higher threshold may allow for travel paths 448 to be modified in terms of the actual route and/or the travel speed. Still higher bids above a third threshold may result in a different UV 111 being provisioned to provide the requested resource based on the demand. In some implementations, assigned priorities to requests may be used in addition to, or in place of bids. For example, emergency calls may be assigned a highest priority and would take precedence over all other priorities or bids.

In box 712, the UV fleet management service 426 receives bids or priorities from one or more customers for the unallocated computing capacity and/or network connectivity. Where one or more requests are mutually exclusive, the UV demand management service 430 (FIG. 4) may select a maximum set of bids or priorities that represent a highest value and are not mutually exclusive. In some cases, the UV fleet management service 426 may reject bids or priorities outright if the bids or priorities are not above a minimum threshold associated with expense.

In box 715, the UV fleet management service 426 may adjust the travel path 448 or the duration in order to meet the customer requests. There may be a scheduling tolerance with the customer at the destination that may permit adjustment. In some cases, other UVs 111 may be deployed to service the customer with the coverage reservation 452, where accepting the bids may be more lucrative or efficient. In some cases, tentatively accepted bids may be rejected and removed from the schedule if another higher bid is accepted instead of the tentatively accepted bids while the UV 111 is on its route.

In box 718, the UV fleet management service 426 provisions the computing capacity and/or the network connectivity for the one or more customers having accepted bids for ephemeral use along the travel path 448. Each of the customers may be scheduled for respective time periods along the travel path 448 such that the allocated resources are activated when in range and deactivated when out of range. Thereafter, the operation of the portion of the UV fleet management service 426 ends.

Figure 8:
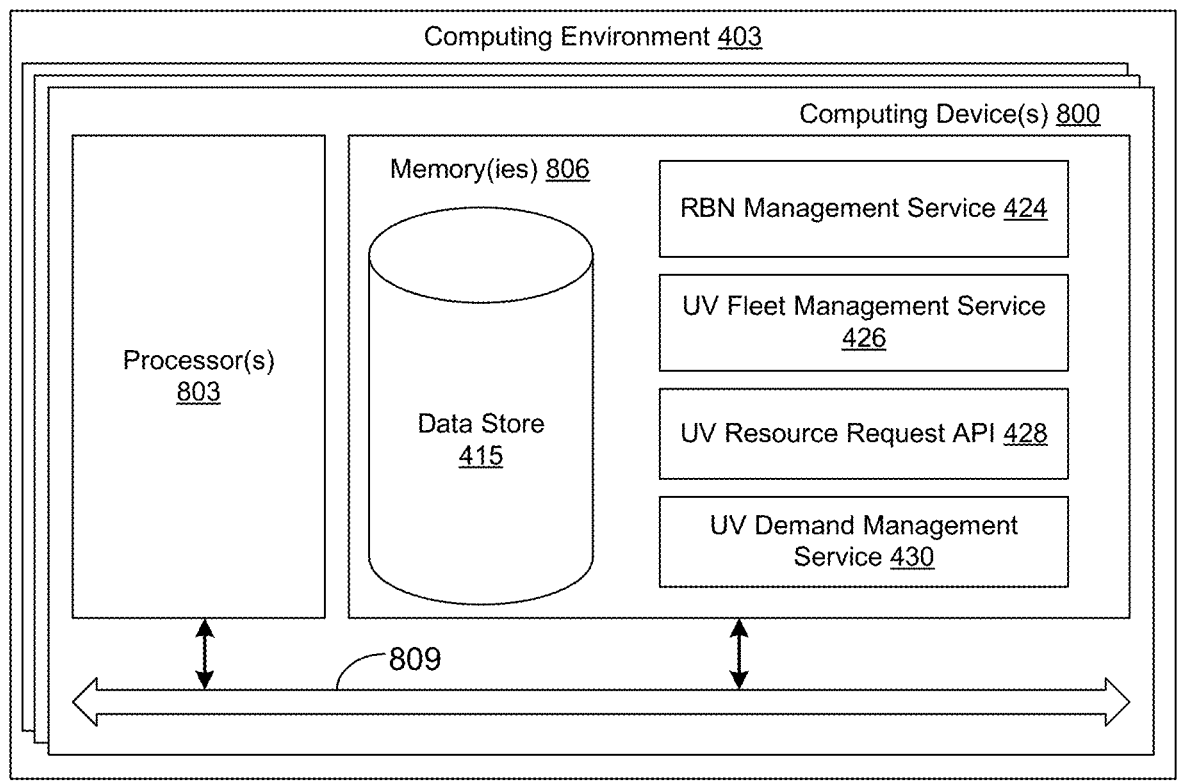
FIG. 8 is a schematic block diagram that provides one example illustration of a computing environment employed in the networked environment of FIG. 4 according to various embodiments of the present disclosure.

With reference to FIG. 8, shown is a schematic block diagram of the computing environment 403 according to an embodiment of the present disclosure. The computing environment 403 includes one or more computing devices 800. Each computing device 800 includes at least one processor circuit, for example, having a processor 803 and a memory 806, both of which are coupled to a local interface 809. To this end, each computing device 800 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the RBN management service 424, the UV fleet management service 426, the UV resource request API 428, the UV demand management service 430, and potentially other applications. Also stored in the memory 806 may be a data store 415 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the RBN management service 424, the UV fleet management service 426, the UV resource request API 428, the UV demand management service 430, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5A-7 show the functionality and operation of an implementation of portions of the UV fleet management service 426. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 5A-7 show a specific order of execution, it is understood that the order of execution may differ from that which is depicted. For example, the order of execution of two or more blocks may be scrambled relative to the order shown. Also, two or more blocks shown in succession in FIGS. 5A-7 may be executed concurrently or with partial concurrence. Further, in some embodiments, one or more of the blocks shown in FIGS. 5A-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the RBN management service 424, the UV fleet management service 426, the UV resource request API 428, and the UV demand management service 430, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the RBN management service 424, the UV fleet management service 426, the UV resource request API 428, and the UV demand management service 430, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 800, or in multiple computing devices 800 in the same computing environment 403.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Embodiments of the present disclosure may be described by one or more of the following clauses:

Clause 1. A system, comprising: a radio-based network; a plurality of unmanned aerial vehicles; and at least one computing device of a cloud provider network, the at least one computing device implementing a service for managing dynamic locations of radio units of the radio-based network, the at least one computing device configured to at least: determine, by the service, to add coverage to the radio-based network in an area to fill a coverage gap in the area; identify a particular unmanned aerial vehicle of the plurality of unmanned aerial vehicles based at least in part on a proximity of the particular unmanned aerial vehicle to the area, the particular unmanned aerial vehicle carrying a radio unit as a payload; instruct the particular unmanned aerial vehicle to fly to a particular location in the area; instruct the particular unmanned aerial vehicle to deliver the radio unit to the particular location; and activate the radio unit to add the coverage to the radio-based network.

Clause 2. The system of clause 1, wherein the at least one computing device is further configured to at least identify the particular unmanned aerial vehicle further based at least in part on at least one of: a remaining fuel of the particular unmanned aerial vehicle, an altitude of the particular unmanned aerial vehicle, an output power of the radio unit, or one or more connectivity requirements for the radio-based network.

Clause 3. The system of clauses 1 to 2, wherein the at least one computing device is further configured to at least determine the particular location based at least in part on at least one of: a remaining fuel of the particular unmanned aerial vehicle, an interference level observed by the particular unmanned aerial vehicle, one or more geographical regulations pertaining to the particular location, an altitude of the particular unmanned aerial vehicle, an output power of the radio unit, or one or more connectivity requirements for the radio-based network.

Clause 4. The system of clauses 1 to 3, wherein the radio unit is powered by a battery, and the at least one computing device is further configured to at least: determine a charge level of the battery of the radio unit is below a threshold; identify another unmanned aerial vehicle of the plurality of unmanned aerial vehicles that is carrying a replacement battery based at least in part on a proximity of the other unmanned aerial vehicle to the particular location; and instruct the other unmanned aerial vehicle to fly to the particular location and exchange the battery of the radio unit with the replacement battery.

Clause 5. The system of clauses 1 to 4, wherein the at least one computing device is further configured to at least: determine that the coverage of the radio-based network does not meet a quality-of-service parameter; and determine that adding the radio unit to the radio-based network in the area would enable the radio-based network to meet the quality-of-service parameter.

Clause 6. The system of clauses 1 to 5, wherein the radio unit includes computing capacity that functions as a provider substrate extension of a cloud provider network to execute one or more customer workloads; and wherein the radio-based network includes a plurality of radio units previously placed by one or more of the plurality of unmanned aerial vehicles.

Clause 7. A method, comprising: determining, by at least one computing device, to add coverage to a radio-based network via a radio unit; instructing, by the at least one computing device, an unmanned vehicle carrying the radio unit as a payload to travel to a particular location; instructing, by the at least one computing device, the unmanned vehicle to deliver the radio unit to the particular location; and activating, by the at least one computing device, the radio unit to add the coverage to the radio-based network.

Clause 8. The method of clause 7, further comprising determining, by the at least one computing device, the particular location based at least in part on a remaining fuel of the unmanned vehicle.

Clause 9. The method of clauses 7 to 8, further comprising: determining, by the at least one computing device, to remove the radio unit from the radio-based network; removing, by the at least one computing device, the radio unit from the radio-based network; and instructing, by the at least one computing device, the unmanned vehicle to pick up the radio unit from the particular location.

Clause 10. The method of clauses 7 to 9, further comprising configuring, by the at least one computing device, the unmanned vehicle to deliver the radio unit to the particular location so as to enable the radio unit to connect to a network port at the particular location.

Clause 11. The method of clauses 7 to 10, further comprising configuring, by the at least one computing device, the unmanned vehicle to deliver the radio unit to the particular location so as to enable the radio unit to connect to a power transfer port at the particular location.

Clause 12. The method of clauses 7 to 11, wherein the radio unit is powered by a battery, and the method further comprises: determining, by the at least one computing device, that a charge level of the battery of the radio unit is below a threshold; and instructing, by the at least one computing device, the unmanned vehicle carrying a replacement battery to travel to the particular location and exchange the battery of the radio unit with the replacement battery.

Clause 13. The method of clauses 7 to 12, wherein the radio unit is powered by a battery, and the method further comprises: determining, by the at least one computing device, that a charge level of the battery of the radio unit is below a threshold; and instructing, by the at least one computing device, the unmanned vehicle to travel to the particular location and recharge the battery of the radio unit.

Clause 14. The method of clauses 7 to 13, wherein determining to add the coverage to the radio-based network via the radio unit further comprises: determining, by the at least one computing device, that the coverage of the radio-based network does not meet a quality-of-service parameter; and determining, by the at least one computing device, that adding the radio unit to the radio-based network at the particular location would enable the radio-based network to meet the quality-of-service parameter.

Clause 15. The method of clauses 7 to 14, wherein the radio unit is of a first type, and the method further comprises: determining, by the at least one computing device, that the coverage provided by the radio unit for the radio-based network does not meet a quality-of-service parameter; determining, by the at least one computing device, that replacing the radio unit with a different radio unit of a second type would enable the coverage for the radio-based network to meet the quality-of-service parameter; instructing, by the at least one computing device, the unmanned vehicle carrying the different radio unit as the payload to travel to the particular location; and instructing, by the at least one computing device, the unmanned vehicle to exchange the radio unit with the different radio unit.

Clause 16. The method of clauses 7 to 15, wherein the radio unit includes computing capacity that functions as a provider substrate extension of a cloud provider network to execute one or more customer workloads.

Clause 17. The method of clauses 7 to 16, wherein the radio unit communicates with at least one other radio unit in the radio-based network to route network communications.

Clause 18. A method, comprising: determining, by at least one computing device, to remove a particular radio unit from a plurality of radio units in a radio-based network, the particular radio unit being at a particular location; deactivating, by the at least one computing device, the particular radio unit in the radio-based network; instructing, by the at least one computing device, an unmanned vehicle to travel to the particular location; and instructing, by the at least one computing device, the unmanned vehicle to remove the particular radio unit from the particular location.

Clause 19. The method of clause 18, further comprising: instructing, by the at least one computing device, the unmanned vehicle carrying a different radio unit as payload to deliver the different radio unit to the particular location before removing the particular radio unit; and activating, by the at least one computing device, the different radio unit to replace the radio unit on the radio-based network.

Clause 20. The method of clause 18, further comprising causing, by the at least one computing device, the radio unit to disconnect from at least one of: a power transfer port or a network port at the particular location.

Clause 21. A system, comprising: a radio-based network; a plurality of unmanned vehicles individually capable of providing edge computing capacity and network connectivity to the radio-based network; and at least one computing device of a cloud provider network, the at least one computing device implementing a service for managing the plurality of unmanned vehicles to provide the edge computing capacity and the network connectivity, the at least one computing device being configured to at least: determine that the edge computing capacity provided by one or more of the plurality of unmanned vehicles is needed in a particular area to meet a quality-of-service requirement; identify a particular unmanned vehicle of the plurality of unmanned vehicles to provide at least a portion of the edge computing capacity based at least in part on a proximity of the particular unmanned vehicle to the particular area; identify an optimal location in the particular area based at least in part on an analysis of one or more parameters; instruct the particular unmanned vehicle to travel to the optimal location in the particular area; and provide the at least the portion of the edge computing capacity from the particular unmanned vehicle to the radio-based network at the optimal location.

Clause 22. The system of clause 21, wherein the particular unmanned vehicle provides the network connectivity to a different radio-based network while traveling to the optimal location.

Clause 23. The system of clauses 21 to 22, wherein the particular unmanned vehicle provides the at least the portion of the edge computing capacity at the optimal location for a particular time period.

Clause 24. The system of clauses 21 to 23, wherein the at least the portion of the edge computing capacity is used to execute at least one network function workload for the radio-based network.

Clause 25. A method, comprising: determining, by at least one computing device, that edge computing capacity is needed in a particular area; identifying, by the at least one computing device, a particular unmanned vehicle to provide at least a portion of the edge computing capacity based at least in part on a proximity of the particular unmanned vehicle to the particular area; instructing, by the at least one computing device, the particular unmanned vehicle to travel to a particular location in the particular area; and providing, by the at least one computing device, the at least the portion of the edge computing capacity from the particular unmanned vehicle to a radio-based network at the particular location.

Clause 26. The method of clause 25, wherein identifying the particular unmanned vehicle to provide the at least the portion of the edge computing capacity further comprises determining, by the at least one computing device, to utilize the particular unmanned vehicle instead of other computing capacity available to the radio-based network based at least in part on a quality-of-service requirement associated with a workload.

Clause 27. The method of clauses 25 to 26, further comprising determining, by the at least one computing device, the particular location based at least in part on a linear optimization of parameters including at least one of: a remaining fuel, the particular area, or the at least the portion of the edge computing capacity to be provided.

Clause 28. The method of clauses 25 to 27, further comprising scheduling, by the at least one computing device, the particular unmanned vehicle to provide the at least the portion of the edge computing capacity for a particular time period.

Clause 29. The method of clauses 25 to 28, further comprising providing, by the at least one computing device, network connectivity to a different radio-based network from the particular unmanned vehicle while the particular unmanned vehicle is traveling to the particular location.

Clause 30. The method of clauses 25 to 29, further comprising providing, by the at least one computing device, network connectivity to the radio-based network from the particular unmanned vehicle while the at least the portion of the edge computing capacity is being provided to the radio-based network from the particular unmanned vehicle.

Clause 31. The method of clauses 25 to 30, wherein the particular unmanned vehicle is an unmanned aerial vehicle, and the method further comprises instructing, by the at least one computing device, the unmanned aerial vehicle to provide the at least the portion of the edge computing capacity while flying at or near the particular location.

Clause 32. The method of clauses 25 to 31, wherein the particular unmanned vehicle is an unmanned aerial vehicle, and the method further comprises instructing, by the at least one computing device, the unmanned aerial vehicle to land at or near the particular location to provide the at least the portion of the edge computing capacity.

Clause 33. The method of clauses 25 to 32, further comprising determining, by the at least one computing device, that the particular unmanned vehicle is suitable to provide the at least the portion of the edge computing capacity based at least in part on a computing capability of the particular unmanned vehicle and a battery charge level of the particular unmanned vehicle.

Clause 34. The method of clauses 25 to 33, wherein the at least the portion of the edge computing capacity is used to perform at least one network function for the radio-based network.

Clause 35. The method of clauses 25 to 34, further comprising instructing, by the at least one computing device, the particular unmanned vehicle to receive a hardware component from, or provide the hardware component to, a computing device at the particular location.

Clause 36. The method of clauses 25 to 35, further comprising instructing, by the at least one computing device, the particular unmanned vehicle to transfer data to or from a storage device at the particular location.

Clause 37. A method, comprising: determining, by at least one computing device, that network connectivity is needed for a radio-based network at a particular location; identifying, by the at least one computing device, a particular unmanned vehicle to provide the network connectivity based at least in part on a proximity of the particular unmanned vehicle to the particular location; instructing, by the at least one computing device, the particular unmanned vehicle to travel to the particular location; providing, by the at least one computing device, the network connectivity from the particular unmanned vehicle for the radio-based network at the particular location; and providing, by the at least one computing device, edge computing capacity from the particular unmanned vehicle at the particular location.

Clause 38. The method of clause 37, further comprising transferring, by the at least one computing device, at least one workload to the edge computing capacity of the particular unmanned vehicle to meet a quality-of-service requirement.

Clause 39. The method of clauses 37 to 38, wherein the network connectivity and the edge computing capacity are provided at the particular location for a particular time period.

Clause 40. The method of clauses 37 to 39, further comprising optimizing, by the at least one computing device, a travel path of the particular unmanned vehicle based at least in part on providing the network connectivity to a different radio-based network while traveling to the particular location.

Clause 41. A system, comprising: an unmanned aerial vehicle capable of providing computing capacity and network connectivity; and at least one computing device of a cloud provider network, the at least one computing device implementing a service managing the unmanned aerial vehicle, the at least one computing device being configured to at least: schedule the unmanned aerial vehicle to provide at least one of the computing capacity or the network connectivity to a customer at a destination location; determine a travel path for the unmanned aerial vehicle from a starting location to the destination location; offer the at least one of the computing capacity or the network connectivity to a plurality of customers along the travel path; and provision the at least one of the computing capacity or the network connectivity for at least one of the plurality of customers for ephemeral use as the unmanned aerial vehicle progresses along the travel path.

Clause 42. The system of clause 41, wherein the at least one of the plurality of customers corresponds to a radio-based network, and provisioning the computing capacity further comprises executing at least one network function workload of the radio-based network on the computing capacity of the unmanned aerial vehicle.

Clause 43. The system of clauses 41 to 42, wherein the at least one computing device is configured to at least schedule another unmanned aerial vehicle to provide the at least one of the computing capacity or the network connectivity to the customer based at least in part on a demand from the at least one of the plurality of customers.

Clause 44. The system of clauses 41 to 43, wherein the at least one computing device is configured to at least offer the at least one of the computing capacity or the network connectivity to the customer based at least in part on a demand for the at least one of the computing capacity or the network connectivity along the travel path to the customer.

Clause 45. The system of clauses 41 to 44, wherein the at least one computing device is configured to at least adjust the travel path based at least in part on a bid received from the at least one of the plurality of customers.

Clause 46. The system of clauses 41 to 45, wherein the at least one computing device is configured to at least adjust a travel time along the travel path based at least in part on a bid received from the at least one of the plurality of customers.

Clause 47. The system of clauses 41 to 46, wherein the at least one computing device is configured to at least identify the plurality of customers based at least in part on a proximity of one or more computing devices of the plurality of customers to the travel path.

Clause 48. A method, comprising: determining, by at least one computing device, that an unmanned vehicle has unallocated computing capacity along a travel path; identifying, by the at least one computing device, a customer based at least in part on a proximity of one or more computing devices of the customer to the travel path; and provisioning, by the at least one computing device, at least a portion of the unallocated computing capacity for use by the customer for a time period as the unmanned vehicle progresses on the travel path.

Clause 49. The method of clause 48, further comprising provisioning, by the at least one computing device, network connectivity via the unmanned vehicle for the customer for the time period.

Clause 50. The method of clauses 48 to 49, further comprising extending, by the at least one computing device, a travel time for the travel path based at least in part on a demand for the unallocated computing capacity.

Clause 51. The method of clauses 48 to 50, further comprising determining, by the at least one computing device, the travel path based at least in part on a demand for the unallocated computing capacity.

Clause 52. The method of clauses 48 to 51, further comprising selecting, by the at least one computing device, the customer from a plurality of customers based at least in part on the customer submitting a maximum bid for the unallocated computing capacity.

Clause 53. The method of clauses 48 to 52, further comprising reserving, by the at least one computing device, the unallocated computing capacity for another customer after the time period at an end of the travel path.

Clause 54. The method of clauses 48 to 53, further comprising offering, by the at least one computing device, the unallocated computing capacity to the customer.

Clause 55. The method of clauses 48 to 54, wherein the customer corresponds to a radio-based network, and the unallocated computing capacity is used to execute one or more network functions of the radio-based network.

Clause 56. A method, comprising: determining, by at least one computing device, that an unmanned vehicle has unallocated network connectivity along a travel path; determining, by the at least one computing device, that a radio-based network has a coverage gap proximate to the travel path; and provisioning, by the at least one computing device, at least a portion of the unallocated network connectivity for use by the radio-based network for a time period as the unmanned vehicle progresses on the travel path.

Clause 57. The method of clause 56, further comprising: receiving, by the at least one computing device, a first bid from the radio-based network for the unallocated network connectivity; and determining, by the at least one computing device, that the first bid has a greater value than a second bid from another radio-based network for the unallocated network connectivity.

Clause 58. The method of clauses 56 to 57, further comprising scheduling, by the at least one computing device, another unmanned vehicle to provide network connectivity to the radio-based network after the time period.

Clause 59. The method of clauses 56 to 58, further comprising offering, by the at least one computing device, the unallocated network connectivity to the radio-based network in response to determining that the radio-based network has the coverage gap proximate to the travel path.

Clause 60. The method of clause 59, wherein the coverage gap is a time-specific coverage gap correlated to the time period at which the travel path enables the unmanned vehicle to provide coverage to the radio-based network.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications Therefore, the following is claimed:

1. A system, comprising:
a radio-based network;
a plurality of unmanned aerial vehicles; and
at least one computing device of a cloud provider network, the at least one computing device implementing a service for managing dynamic locations of radio units of the radio-based network, the at least one computing device configured to at least:
determine, by the service, to add coverage to the radio-based network in an area to fill a coverage gap in the area;
identify a particular unmanned aerial vehicle of the plurality of unmanned aerial vehicles based at least in part on a proximity of the particular unmanned aerial vehicle to the area, the particular unmanned aerial vehicle carrying a radio unit as a payload;
instruct the particular unmanned aerial vehicle to fly to a particular location in the area;
instruct the particular unmanned aerial vehicle to deliver the radio unit to the particular location; and
activate the radio unit to add the coverage to the radio-based network.

2. The system of claim 1, wherein the at least one computing device is further configured to at least identify the particular unmanned aerial vehicle further based at least in part on at least one of: a remaining fuel of the particular unmanned aerial vehicle, an altitude of the particular unmanned aerial vehicle, an output power of the radio unit, or one or more connectivity requirements for the radio-based network.

3. The system of claim 1, wherein the at least one computing device is further configured to at least determine the particular location based at least in part on at least one of: a remaining fuel of the particular unmanned aerial vehicle, an interference level observed by the particular unmanned aerial vehicle, one or more geographical regulations pertaining to the particular location, an altitude of the particular unmanned aerial vehicle, an output power of the radio unit, or one or more connectivity requirements for the radio-based network.

4. The system of claim 1, wherein the radio unit is powered by a battery, and the at least one computing device is further configured to at least:
determine a charge level of the battery of the radio unit is below a threshold;
identify another unmanned aerial vehicle of the plurality of unmanned aerial vehicles that is carrying a replacement battery based at least in part on a proximity of the other unmanned aerial vehicle to the particular location; and
instruct the other unmanned aerial vehicle to fly to the particular location and exchange the battery of the radio unit with the replacement battery.

5. The system of claim 1, wherein the at least one computing device is further configured to at least:
determine that the coverage of the radio-based network does not meet a quality-of-service parameter; and
determine that adding the radio unit to the radio-based network in the area would enable the radio-based network to meet the quality-of-service parameter.

6. The system of claim 1, wherein the radio unit includes computing capacity that functions as a provider substrate extension of a cloud provider network to execute one or more customer workloads; and
wherein the radio-based network includes a plurality of radio units previously placed by one or more of the plurality of unmanned aerial vehicles.

7. A method, comprising:
determining, by at least one computing device, to add coverage to a radio-based network via a radio unit;
instructing, by the at least one computing device, an unmanned vehicle carrying the radio unit as a payload to travel to a particular location;
instructing, by the at least one computing device, the unmanned vehicle to deliver the radio unit to the particular location; and
activating, by the at least one computing device, the radio unit to add the coverage to the radio-based network.

8. The method of claim 7, further comprising determining, by the at least one computing device, the particular location based at least in part on a remaining fuel of the unmanned vehicle.

9. The method of claim 7, further comprising:
determining, by the at least one computing device, to remove the radio unit from the radio-based network;
removing, by the at least one computing device, the radio unit from the radio-based network; and
instructing, by the at least one computing device, the unmanned vehicle to pick up the radio unit from the particular location.

10. The method of claim 7, further comprising configuring, by the at least one computing device, the unmanned vehicle to deliver the radio unit to the particular location so as to enable the radio unit to connect to a network port at the particular location.

11. The method of claim 7, further comprising configuring, by the at least one computing device, the unmanned vehicle to deliver the radio unit to the particular location so as to enable the radio unit to connect to a power transfer port at the particular location.

12. The method of claim 7, wherein the radio unit is powered by a battery, and the method further comprises:
determining, by the at least one computing device, that a charge level of the battery of the radio unit is below a threshold; and
instructing, by the at least one computing device, the unmanned vehicle carrying a replacement battery to travel to the particular location and exchange the battery of the radio unit with the replacement battery.

13. The method of claim 7, wherein the radio unit is powered by a battery, and the method further comprises:
determining, by the at least one computing device, that a charge level of the battery of the radio unit is below a threshold; and
instructing, by the at least one computing device, the unmanned vehicle to travel to the particular location and recharge the battery of the radio unit.

14. The method of claim 7, wherein determining to add the coverage to the radio-based network via the radio unit further comprises:
determining, by the at least one computing device, that the coverage of the radio-based network does not meet a quality-of-service parameter; and
determining, by the at least one computing device, that adding the radio unit to the radio-based network at the particular location would enable the radio-based network to meet the quality-of-service parameter.

15. The method of claim 7, wherein the radio unit is of a first type, and the method further comprises:

determining, by the at least one computing device, that the coverage provided by the radio unit for the radio-based network does not meet a quality-of-service parameter;

determining, by the at least one computing device, that replacing the radio unit with a different radio unit of a second type would enable the coverage for the radio-based network to meet the quality-of-service parameter;

instructing, by the at least one computing device, the unmanned vehicle carrying the different radio unit as the payload to travel to the particular location; and instructing, by the at least one computing device, the unmanned vehicle to exchange the radio unit with the different radio unit.

16. The method of claim 7, wherein the radio unit includes computing capacity that functions as a provider substrate extension of a cloud provider network to execute one or more customer workloads.

17. The method of claim 7, wherein the radio unit communicates with at least one other radio unit in the radio-based network to route network communications.

18. A method, comprising:

determining, by at least one computing device, to remove a particular radio unit from a plurality of radio units in a radio-based network, the particular radio unit being at a particular location;

deactivating, by the at least one computing device, the particular radio unit in the radio-based network;

instructing, by the at least one computing device, an unmanned vehicle to travel to the particular location; and instructing, by the at least one computing device, the unmanned vehicle to remove the particular radio unit from the particular location.

19. The method of claim 18, further comprising:

instructing, by the at least one computing device, the unmanned vehicle carrying a different radio unit as payload to deliver the different radio unit to the particular location before removing the particular radio unit; and activating, by the at least one computing device, the different radio unit to replace the radio unit on the radio-based network.

20. The method of claim 18, further comprising causing, by the at least one computing device, the radio unit to disconnect from at least one of: a power transfer port or a network port at the particular location.

* * * * *